United States Patent
Vojcic et al.

(10) Patent No.: US 8,948,272 B2
(45) Date of Patent: Feb. 3, 2015

(54) JOINT SOURCE-CHANNEL DECODING WITH SOURCE SEQUENCE AUGMENTATION

(71) Applicant: Digital PowerRadio, LLC, Palm Beach, FL (US)

(72) Inventors: Branimir R Vojcic, Vienna, VA (US); Ivan V Bajic, Vancouver (CA); Javad Haghighat, Montreal (CA)

(73) Assignee: Digital PowerRadio, LLC, Palm Beach, FL (US)

( * ) Notice: Subject to any disclaimer, the term of this patent is extended or adjusted under 35 U.S.C. 154(b) by 0 days.

(21) Appl. No.: 13/693,031

(22) Filed: Dec. 3, 2012

(65) Prior Publication Data
US 2014/0153654 A1    Jun. 5, 2014

(51) Int. Cl.
*H04N 7/12* (2006.01)
*H04N 11/02* (2006.01)
*H04N 11/04* (2006.01)
*H04N 19/65* (2014.01)

(52) U.S. Cl.
CPC .............................. *H04N 19/00854* (2013.01)
USPC ...... 375/240.28; 375/363; 375/365; 375/366; 375/367; 375/368

(58) Field of Classification Search
CPC .................... G11B 20/1813; G11B 2020/148; H04L 7/041; H04L 1/0083; H04L 7/048; H04L 1/0079
USPC .............................. 375/240.28, 363, 365–368
See application file for complete search history.

(56) References Cited

U.S. PATENT DOCUMENTS

| | | | |
|---|---|---|---|
| 5,278,844 A | 1/1994 | Murphy et al. | |
| 5,289,476 A * | 2/1994 | Johnson et al. | 714/775 |
| 5,315,583 A | 5/1994 | Murphy et al. | |
| 5,465,396 A | 11/1995 | Hunsinger et al. | |
| 5,511,099 A * | 4/1996 | Ko et al. | 375/368 |
| 5,517,535 A | 5/1996 | Kroeger et al. | |

(Continued)

OTHER PUBLICATIONS

ISO/IEC JTC1/SC29/WG11 14496-3, "MPEG-4: Information technology—Coding of audio-visual objects—Part 3: Audio," 2009. [Online]. Available: http://standards.iso.org/ittf/PubliclyAvailableStandards/index.html. [Accessed 2011].

(Continued)

*Primary Examiner* — Kenneth Lam
*Assistant Examiner* — Sung Ahn
(74) *Attorney, Agent, or Firm* — Bryan Cave LLP

(57) ABSTRACT

Methods and systems for augmenting a source message by suitably-chosen bits and/or sequences of bits for the purpose of enhancing decoding or synchronization performance. Properties of the source message can be used to select and optimize synchronization sequences, including their length and placement within the source message. Various message attributes, such as message or segment weight, symbol counts, and others, including their combinations, may be encoded into the synchronization sequence to further improve decoding performance in the presence of errors. These methods and systems can be employed for standalone source decoding of noisy bit streams, as well as iterative joint source-channel decoding. They may further be combined with other methods whether or not known in the art, such as CRC and forward error correction, to achieve the desired performance complexity trade-off.

16 Claims, 20 Drawing Sheets

Appending a SYNC sequence to a Variable Length Coded (VLC) message

(56) References Cited

U.S. PATENT DOCUMENTS

| | | | |
|---|---|---|---|
| 5,523,726 | A | 6/1996 | Kroeger et al. |
| 5,559,830 | A | 9/1996 | Dapper et al. |
| 5,566,214 | A | 10/1996 | Kroeger et al. |
| 5,579,345 | A | 11/1996 | Kroeger et al. |
| 5,588,022 | A | 12/1996 | Dapper et al. |
| 5,606,576 | A | 2/1997 | Dapper et al. |
| 5,633,896 | A | 5/1997 | Carlin et al. |
| 5,646,947 | A | 7/1997 | Cooper et al. |
| 5,703,954 | A | 12/1997 | Dapper et al. |
| 5,745,525 | A | 4/1998 | Hunsinger et al. |
| 5,757,854 | A | 5/1998 | Hunsinger et al. |
| 5,764,706 | A | 6/1998 | Carlin et al. |
| 5,809,065 | A | 9/1998 | Dapper et al. |
| 5,828,705 | A | 10/1998 | Kroeger et al. |
| 5,850,415 | A | 12/1998 | Hunsinger et al. |
| 5,878,089 | A | 3/1999 | Dapper et al. |
| 5,903,598 | A | 5/1999 | Hunsinger et al. |
| 5,949,813 | A | 9/1999 | Hunsinger et al. |
| 5,956,373 | A | 9/1999 | Goldston et al. |
| 5,956,624 | A | 9/1999 | Hunsinger et al. |
| 6,014,407 | A | 1/2000 | Hunsinger et al. |
| 6,108,810 | A | 8/2000 | Kroeger et al. |
| 6,128,350 | A | 10/2000 | Shastri et al. |
| 6,148,007 | A | 11/2000 | Kroeger |
| 6,178,317 | B1 | 1/2001 | Kroeger et al. |
| 6,259,893 | B1 | 7/2001 | Kroeger et al. |
| 6,292,511 | B1 | 9/2001 | Goldston et al. |
| 6,292,917 | B1 | 9/2001 | Sinha et al. |
| 6,295,317 | B1 | 9/2001 | Hartup et al. |
| 6,301,430 | B1* | 10/2001 | Oguro et al. ............... 386/253 |
| 6,317,470 | B1 | 11/2001 | Kroeger et al. |
| 6,345,377 | B1 | 2/2002 | Kroeger et al. |
| 6,353,637 | B1 | 3/2002 | Mansour et al. |
| 6,366,888 | B1 | 4/2002 | Kroon et al. |
| 6,400,758 | B1 | 6/2002 | Goldston et al. |
| 6,405,338 | B1 | 6/2002 | Sinha et al. |
| 6,430,227 | B1 | 8/2002 | Kroeger et al. |
| 6,430,401 | B1 | 8/2002 | Lou et al. |
| 6,452,977 | B1 | 9/2002 | Goldston et al. |
| 6,480,536 | B2 | 11/2002 | Hartup et al. |
| 6,487,256 | B2 | 11/2002 | Kroeger et al. |
| 6,510,175 | B1 | 1/2003 | Hunsinger et al. |
| 6,523,147 | B1 | 2/2003 | Kroeger et al. |
| 6,532,258 | B1 | 3/2003 | Goldston et al. |
| 6,539,063 | B1 | 3/2003 | Peyla et al. |
| 6,549,544 | B1 | 4/2003 | Kroeger et al. |
| 6,556,639 | B1 | 4/2003 | Goldston et al. |
| 6,563,880 | B1 | 5/2003 | Hunsinger et al. |
| 6,570,943 | B2 | 5/2003 | Goldston et al. |
| 6,590,944 | B1 | 7/2003 | Kroeger |
| 6,622,008 | B2 | 9/2003 | Kroeger et al. |
| 6,639,949 | B2 | 10/2003 | Kroeger et al. |
| 6,671,340 | B1 | 12/2003 | Kroeger et al. |
| 6,892,343 | B2* | 5/2005 | Sayood et al. ............... 714/779 |
| 6,982,948 | B2 | 1/2006 | Kroeger et al. |
| 7,256,718 | B2* | 8/2007 | Nakagawa et al. ............. 341/59 |
| 7,305,056 | B2 | 12/2007 | Kroeger |
| 7,724,850 | B2 | 5/2010 | Kroeger et al. |
| 7,796,716 | B2* | 9/2010 | Bhukania et al. ............. 375/346 |
| 2002/0026616 | A1* | 2/2002 | Kikuchi et al. ............. 714/752 |
| 2002/0041570 | A1 | 4/2002 | Ptasinski et al. |
| 2002/0075974 | A1* | 6/2002 | Mill .............................. 375/340 |
| 2004/0155802 | A1 | 8/2004 | Lamy et al. |
| 2004/0165512 | A1* | 8/2004 | Kim et al. ................. 369/59.24 |
| 2005/0175123 | A1* | 8/2005 | Gurney et al. ................ 375/324 |
| 2005/0249266 | A1* | 11/2005 | Brown et al. ................ 375/133 |
| 2005/0275573 | A1 | 12/2005 | Raveendran |
| 2006/0268965 | A1 | 11/2006 | Ibrahim et al. |
| 2007/0140375 | A1 | 6/2007 | Jeanne et al. |
| 2007/0257786 | A1 | 11/2007 | King et al. |
| 2008/0250294 | A1* | 10/2008 | Ngo et al. ..................... 714/752 |
| 2009/0274248 | A1 | 11/2009 | Hepler et al. |
| 2009/0295607 | A1* | 12/2009 | Au et al. ......................... 341/67 |
| 2010/0077282 | A1 | 3/2010 | Shen et al. |
| 2010/0272157 | A1 | 10/2010 | Lakkis |
| 2011/0035647 | A1 | 2/2011 | Eidson et al. |
| 2012/0060070 | A1 | 3/2012 | Stark |
| 2012/0072802 | A1* | 3/2012 | Chinnici et al. ............... 714/758 |
| 2012/0140769 | A1* | 6/2012 | Hwang et al. ................. 370/389 |

OTHER PUBLICATIONS

Y. Gao, "Audio coding standard overview: MPEG4-AAC, HE-AAC, and HE-AAC V2," Chapter 21 in *Mobile Multimedia Broadcasting Standards: Technology and Practice*, F.-L. Luo (Ed.), Springer, 2009.

J. Herre and H. Purnhagen, "General audio coding," Chapter 11 in *The MPEG-4 Book*, F. Pereira and T. Ebrahimi (Eds.), Prentice-Hall, 2002.

J.-S. Lee, J.-H. Jeong, and T.-G. Chang, "An efficient method of huffman decoding for MPEG-2 AAC and its performance analysis," *IEEE Trans. Speech and Audio Processing*, vol. 13, No. 6, pp. 1206-1209, Nov. 2005.

P. Duhamel and M. Kieffer, Joint source-channel decoding, Academic Press, Jan. 2010, Chapters 5 and 8.

R. Hu, X. Huang, M. Kieffer, O. Derrien and P. Duhamel, "Robust critical data recovery for MPEG-4 AAC encoded bitstreams," in Proc. IEEE ICASSP, Dallas, TX, 2010.

O. Derrien, M. Kieffer and P. Duhamel, "Joint source/channel decoding of scalefactors in MPEG-AAC encoded bitstreams," in Proc. EUSIPCO, Lausanne, Switzerland, 2008.

C. Marin, Y. Leprovost, M. Kieffer and P. Duhamel, "Robust MAC-lite and soft header recovery for packetized multimedia transmission," IEEE Trans. Communications, vol. 58, No. 3, pp. 775-784, Mar. 2010.

L. Cao, L. Yao and C. W. Chen, "MAP decoding of variable length codes with self-synchronization strings," IEEE Trans. Signal Processing, vol. 55, No. 8, pp. 4325-4330, Aug. 2007.

M. Park and D. J. Miller, "Joint source-channel decoding for variable-length encoded data by exact and approximate MAP sequence estimation," IEEE Trans. Communications, vol. 48, No. 1, pp. 1-6, Jan. 2000.

K. Sayood, H. H. Otu, and N. Demir, "Joint source/channel coding for variable length codes," IEEE Trans. Communications, vol. 48, No. 5, pp. 787-794, May 2000.

C. Guillemot and P. Siohan, "Joint source-channel decoding of variable-length codes with soft information: A survey," EURASIP J. Appl. Signal Processing, vol. 6, pp. 906-927, 2005.

J. B. Anderson and S. Mohan, Source and channel coding: An algorithmic approach, Kluwer Academic Publishers, 1991, Chapter 6.2.

L. Bahl, J. Cocke, F. Jelinek, and J. Raviv, "Optimal decoding of linear codes for minimizing symbol error rate," IEEE Trans. Information Theory, vol. 20, No. 2, pp. 284-287, Mar. 1974.

J. Hagenauer, E. Offer, and L. Papke, "Iterative decoding of binary block and convolutional codes," IEEE Trans. Information Theory, vol. 42, No. 2, pp. 429-445, Mar. 1996.

J. Hagenauer and C. Kuhn, "The list-sequential (LISS) algorithm and its application," IEEE Trans. Communications, vol. 55, No. 5, pp. 918-928, May 2007.

P. A. Regalia, "Iterative decoding of concatenated codes: A tutorial," EURASIP J. Appl. Signal Processing, vol. 6, pp. 762-774, 2005.

A. Hedayat and A. Nosratinia, "Iterative list decoding of concatenated source-channel codes," EURASIP J. Appl. Signal Processing, vol. 6, pp. 954-960, 2005.

K. K. Y. Wong and P. J. McLane, "Bi-directional soft-output M-algorithm for iterative decoding," Proc. IEEE ICC, vol. 2, pp. 792-797, Paris, France, Jun. 2004.

K. K. Y. Wong, The Soft-Output M-Algorithm and Its Applications, Ph.D. Thesis, Queen's University, Kingston, ON, Canada, Aug. 2006.

Notification of Transmittal of the International Search Report and the Written Opinion of the International Searching Authority, or the Declaration, International Search Report and Written Opinion of the International Searching Authority, dated May 13, 2014, PCT/US2013/072907.

\* cited by examiner

Communication system with Joint Source-Channel Decoding (JSCD)

Appending a SYNC sequence to a Variable Length Coded (VLC) message

Structure of the ICS field in LONG and SHORT window frames

PRIOR ART

Strategic insertion of bits in the ICS field in LONG and SHORT window frames to improve decoding Effect of alternating synchronization sequences; comparison of three cases: (i) one alternating synchronization sequence at the end of the source message, (ii) two synchronization sequences, one in the middle and one at the end of the source message, and (iii) seven single-bit parity check bits, located at every 1/7-th of the source message PER performance achieved by non-alternating and alternating synchronization sequences PER performance with different length-7 alternating synchronization sequences; impact of proper sequence selection PER performance of alternating synchronization sequences with different lengths PER performance of length-7 alternating synchronization sequences with rate 2/5 convolutional code, with and without interleaving PER performance of alternating SYNCs with rate 2/5 convolutional code; one SYNC at the end versus multiple SYNCs spread over the source packet Comparison of two coded schemes that apply two length-7 and four length-4 alternating synchronization sequences in the middle and at the end of source message Comparison of schemes that suppress odd error patterns (marked by Diamonds and Triangles) and a scheme that suppresses all error patterns with weights $3w+1$ and $3w+2$, for $w = 0, 1, ...$ (marked by Stars)

Performance of joint source-channel decoding for convolutional coded schemes with different length synchronization sequences; the system is using triple-choice alternating synchronization sequences that suppress all error patterns with weights $3w+1$ and $3w+2$, for $w = 0, 1, ...$ Comparing a mixed-type synchronization scheme (8 SPC bits + one 8-bit Hamming sequence) with a scheme that uses two 8-bit Hamming sequences on scalefactor decoding Comparison between alternating Barker SYNCs and "smart" SYNCs Scalefactors decoding with one attribute-based SYNC in the ICS field and one weight-based SYNC in the scalefactors field Observed probability distribution of the difference between the global gain of channel 1 and the global gain of channel 2 in the same audio frame

JOINT SOURCE-CHANNEL DECODING WITH SOURCE SEQUENCE AUGMENTATION

FIELD OF THE INVENTION

The present invention relates to systems and methods for decoding source messages that may get corrupted in the process of transmission. These systems and methods can be used in any communication system where fixed-length or variable-length coding is employed including audio, image, and video communication.

BACKGROUND

A simplified block diagram of a typical communication system is illustrated in FIG. 1. In this example, a transmitter may include a source encoder 101, employing a variable-length code (VLC) to map source symbols to binary codewords, a channel encoder 102 that adds redundancy to the VLC-coded bit stream, and a modulator 103 to map the channel-coded bit stream to the waveforms appropriate for a particular channel 104. At the receiver, reverse operations (demodulation 105, channel decoding 106, and source decoding 107) are performed. Typically, source and channel decoding are performed separately. Also, source decoding is usually performed on logical hard bits (0/1), or antipodal hard bits (−1/+1), coming out of the channel decoder. Various other components of the transmitter and receiver are omitted for simplicity. For example, an interleaver and deinterleaver may be included, respectively, after and before channel encoder (102) and channel decoder (106). Frequency, phase and timing synchronization blocks could be employed in the receiver as they are well known in the art. Typically, error detection encoders and decoders would be included, usually employing CRC codes. In some radio systems, either multiple transmit or receive antennae, or both, may be included.

In the conventional system shown in FIG. 1, the source and channel codes are decoded separately (see blocks 106 and 107). Other decoding schemes have also been considered in the art whereby the source and channel codes are decoded jointly (see, e.g., US Patent Publication 2007/0140375). In some of these systems, to perform joint source-channel decoding (JSCD), an iterative decoder is presented where the source statistics are measured at the output of the source decoder and used to drive the bit-clocked Max-Log-MAP channel decoder. The source decoder itself operates on hard bits, mapping the binary codewords obtained from the channel decoder to the symbols via a VLC table. In addition, some methods have been presented in which a source decoder is able to process soft bits.

Furthermore, the combination of source and channel decoding can be realized as a symbol-clocked sequential decoder, such as the stack algorithm or M-algorithm. When the VLC-coded message is terminated by a known sequence of bits (as is the case, for example, in audio scalefactor coding by the low complexity mono MPEG-4 AAC source coder, where the terminating sequence is 000), it was suggested in the art that such knowledge can improve the decoding performance. This is because a known terminating sequence helps suppress the paths that have mismatched lengths compared to the correct path, and helps achieve a better estimate of the correct path length.

Some in this field have discussed the problem of separation of different media frames in the same transmission packet, a problem which has been referred to as "burst segmentation." In this setting, media frames are stacked back-to-back, so each frame is terminated by the header of the next frame in the sequence. Since headers usually contain some a priori known or predictable information, such knowledge can be used to help separate the frames and improve decoding due to the same reasons discussed in the previous paragraph, namely, a known terminating sequence helps suppress the paths that have mismatched lengths compared to the correct path. Some VLCs possess so-called Self-Synchronization Strings (SSSs) with the following property: in a bit stream produced by the VLC, the first bit following the end of a SSS is the first bit of some codeword from that VLC. SSS helps the decoder regain symbol synchronization with the encoder. Certain systems have used SSS within a bit-clocked maximum a posteriori (MAP) decoder to improve the performance. However, although an SSS will help the decoder regain symbol synchronization with the encoder following a bit error, the number of decoded symbols prior to the SSS will, in general, be different from the number of encoded symbols, and the path length measured in source symbols will be different from the original path length. Moreover, since SSSs are combinations of codewords, they will occur in the bit stream if and when the corresponding sequence of source symbols is observed. The encoder itself has no control over when and how often SSSs will occur. It would therefore be advantageous if the encoder could control where synchronization happens; this would enable the system to synchronize in the most effective way.

Therefore, there is a need for a method and system that increase control over the synchronization process in joint source-channel decoding and improving source decoding performance.

SUMMARY

According to certain embodiments, joint (as opposed to separate) source-channel decoding is performed in a manner that improves performance of a receiver. Methods and systems are provided to insert specifically-designed synchronization strings or sequences of symbols into bit streams in order to increase control over the synchronization process in such joint source-channel decoding, and to improve source decoding performance by suppressing sequences that exhibit some form of mismatch relative to the synchronization pattern. These methods and systems can be employed for standalone source decoding of noisy bit streams, as well as iterative joint source-channel decoding.

These methods and systems augment a source message bit sequence, or segments thereof, with one or more bits or synchronization sequences to facilitate better source decoding. The bits or synchronization sequences may be placed at a different bit positions within the source message. For example, a single synchronization sequence may be added at the end of the source message bit sequence. The bits or synchronization sequences may be selected based on characteristics of the source message bit sequence, such as a sequence weight modulo-q and/or other source sequence specific attributes. They may be inserted to maximize distance properties of different segment values or to minimize their probability of erroneous decoding. The synchronization sequences may be selected to minimize the bit-error-rate or packet-error-rate performance of source decoding, to maximize Hamming distances between synchronization sequences in the set, and/or to have minimum autocorrelation sidelobes or low autocorrelation function sidelobes. The segments to be augmented may be selected based on their frequency of occurrence, how prone they are to errors, and/or how important they are for decoding or interpreting, such as significant control fields, or segments of high/relevance for perceptual quality.

The properties of a source message can be used to improve decoding, synchronization performance, or both. For example, a window sequence and window shape fields may be jointly decoded, and a global gain value of one channel may be used to improve the decoding of another channel, whereby synchronization sequences and/or bits may be inserted at particular locations and between various fields in the bit stream. Additionally, a source packet may be encoded for unequal error protection by partitioning the source packet, encoding the subpackets to provide additional error protection (e.g., via a forward error correction code, a single parity check code, augmentation of the source bits with synchronization sequences), and additionally encoding the subpackets with a CRC code to facilitate separate error concealment.

Other benefits and features of the present invention may become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

Further features of the invention, its nature and various advantages will be more apparent from the following detailed description of the embodiments, taken in conjunction with the accompanying drawings in which.

DETAILED DESCRIPTION OF PREFERRED EMBODIMENTS

Figure 1:
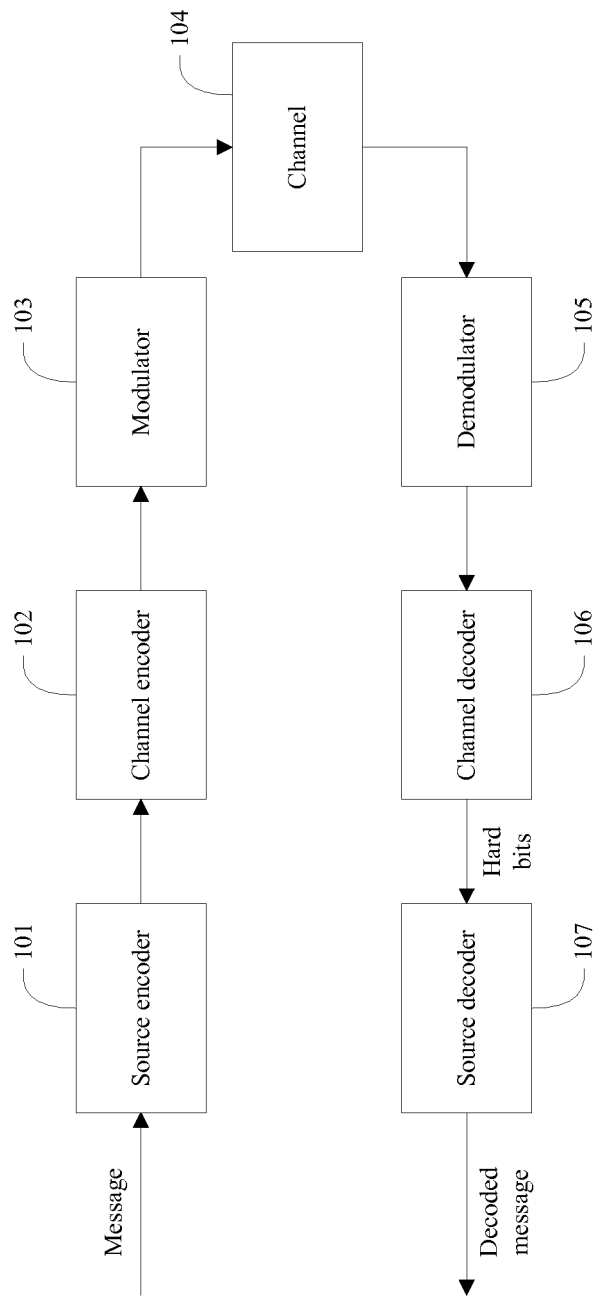
FIG. 1 is a block diagram of a conventional communication system.
Figure 2:
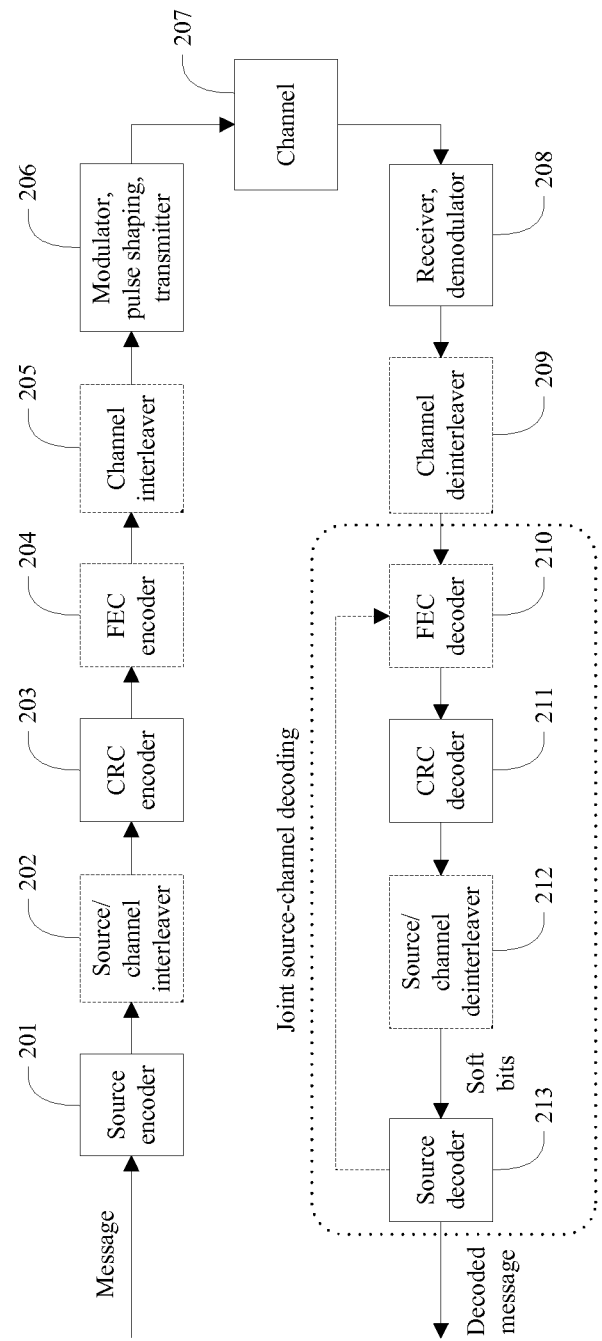
FIG. 2 is a block diagram of a communication system targeted at improved decoding performance in accordance with certain embodiments of the present invention.

Certain aspects of the present invention pertain to various systems and methods to improve the decoding of a source message, as compared to conventional communication systems (such as the one depicted in FIG. 1). As discussed above, the system of FIG. 1 comprises source encoder 101, channel encoder 102, modulator 103, channel 104, demodulator 105, channel decoder 106 and source decoder 107, where source and channel decoding are performed separately. In contrast, FIG. 2 illustrates a communication system in accordance with certain embodiments. Dashed blocks (202, 204, 205, 209, 210, 212) are optional and associated with various embodiments. An important difference between the systems illustrated in these two figures is that source-channel decoding is performed jointly at the receiver in FIG. 2, as indicated by the dotted enclosure, as opposed to having the channel and source codes decoded separately in FIG. 1.

The communication system of FIG. 2 comprises source encoder 201, source/channel interleaver 202, CRC encoder 203, FEC encoder 204, channel interleaver 205, modulator and transmitter 206, channel 207, receiver and demodulator 208, channel deinterleaver 209, FEC decoder 210, CRC decoder 211, source/channel deinterleaver 212, and source decoder 213, where source and channel decoding is performed jointly. Thus, in addition to the basic transmitter and receiver functional blocks from FIG. 1, which now appear as blocks 201, 204, 206, 208, 210, and 213, respectively, additional functional blocks such as source/channel interleaver (202), CRC encoder (203), channel interleaver (205), channel deinterleaver (209), CRC decoder (211) and source/channel deinterleaver (212) are now also present. Dashed blocks are optional and associated with various embodiments of the system. In this configuration, the source decoder may operate directly on soft bits, as indicated in the figure. In addition, joint source-channel decoding may be performed by iterating between the source and channel decoding, as shown in the dotted part of the system in the bottom left part of the figure.

Figure 3:
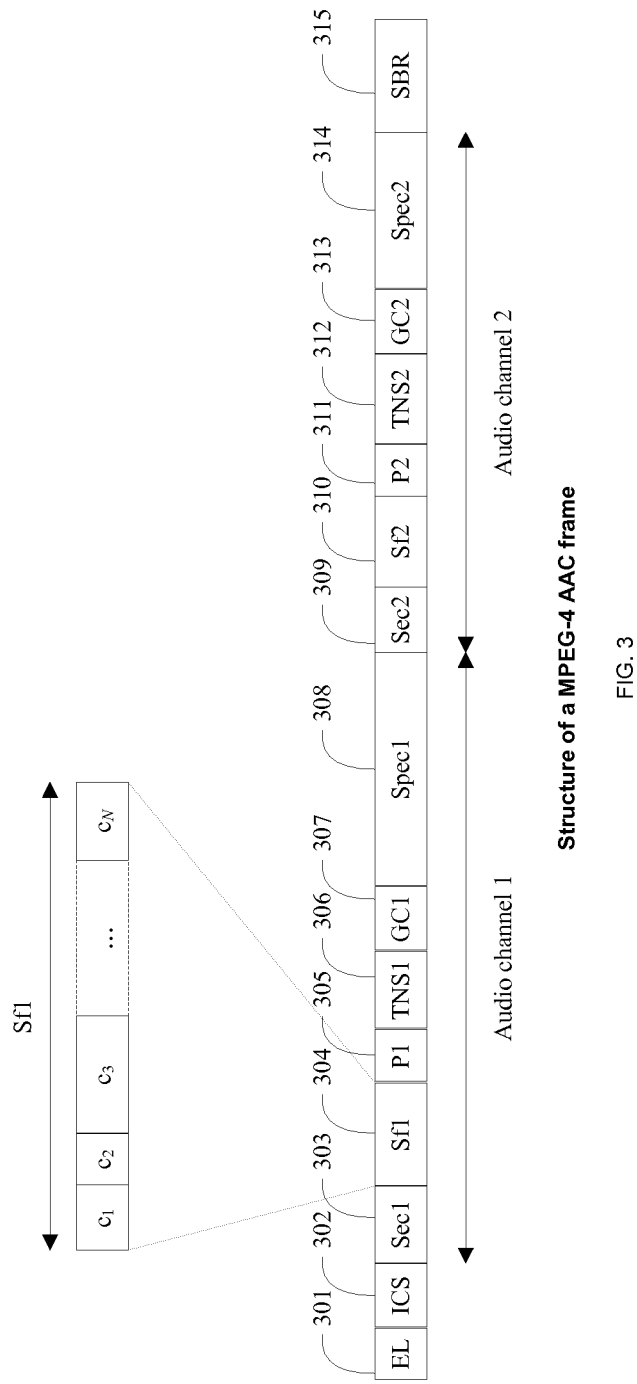
FIG. 3 shows the structure of the MPEG-4 AAC audio frame.

The potential improvements in decoding performance brought by various embodiments are illustrated in terms of decoding of MPEG-4 AAC bit streams, whose structure is illustrated in FIG. 3. These bit streams contain a number of fields including: element ID (EL, 301), individual channel stream information (ICS, 302), section data (Sec1, 303), scalefactors (Sf1, 304), pulse data (P1, 305), temporal noise shaping data (TNS1, 306), gain control data (GC1, 307), and spectral data (Spec1, 308). In stereo bit streams, data fields 303-308 also exist in the second audio channel, and are numbered 309-314 and labeled with suffix 2. In the High-Efficiency (HE) extension of AAC, spectral band replication data (SBR, 315) follows the second audio channel. In the top part of the figure, one of the Huffman-coded fields (Sf1, 304) is shown in more detail. Huffman coded fields contain a sequence of variable-length codewords, depicted in the figure as $c_1, c_2, \ldots, c_N$. It is to be understood that this is done for the purpose of illustration only, and does not limit the scope of the invention or its applicability to other types of bit streams.

Most fields in FIG. 3 are variable length; that is, their length will vary from frame to frame, depending on the audio signal. Scalefactors (304 and 310) and spectral data (308 and 314) are coded using Huffman VLC tables. In the top part of FIG. 3, the structure of such a field is illustrated, using Sf1 (304) as an example. This field consists of N binary codewords, $c_1, c_2, \ldots, c_N$, of different lengths.

Joint source-channel decoding of MPEG-4 AAC bit streams with a specific configuration of low complexity mono MPEG-4 AAC frame is known in the art, where fields 305, 306, and 307 are all equal to 0. Hence, under such configuration, the binary sequence 000 is a known terminating sequence for VLC-coded scalefactors (304), and this knowledge is exploited to improve decoder performance. According to certain aspects of the present invention, certain designed synchronization sequences may be inserted not only at the end of VLC-coded fields, but also within those fields. Also, no specific configuration of the MPEG-4 AAC frame is assumed, and thus the principles of the present invention are much more general and applicable to any MPEG-4 AAC configuration, as well as other VLC-coded data, such as images and video.

It should be noted that, although a significant portion of the discussion herein is presented in the context of a system that employs a particular kind of variable-length coding strategy (e.g., ones that employ codes such MPEG-1, MPEG-2, MPEG-4, H.261, H.263 and H.264), the principles of the invention are applicable to other coding strategies, including ones that employ fixed-length codes, such as ISO 8859-15, UTF-32/UCS-4, etc.

In certain embodiments, alternating synchronization sequences that are applicable to both fixed-length and variable-length codes are used to augment the source message. The alternating synchronization sequence scheme in these embodiments consists of two synchronization sequences that are chosen to have maximum Hamming distance from each other to facilitate better differentiation among sequences with different attributes. An attribute is a suitably chosen property of the source sequence. One example of an attribute, used for illustration purposes in these exemplary embodiments, is the sequence weight modulo-2 (i.e., even or odd number of +1's). Logical bits 1 and 0, respectively, could also be interchangeably represented with antipodal levels +1 and −1, or with some other levels as per specific convention. In addition, SYNC sequences are preferably chosen to have good autocorrelation properties to distinguish better from sequences of source symbols/bits that are out of synchronization. Examples of such sequences, among many others, are Barker and Willard sequences. As an example, with synchronization sequences of length 4 bits, a valid pair of alternating synchronization sequences (assuming antipodal ±1 bit coding) is:

$$\text{Sync\_Seq\#1} = [-1,-1,-1,+1]$$

$$\text{Sync\_Seq\#2} = [+1,+1,+1,-1]$$

Figure 4:
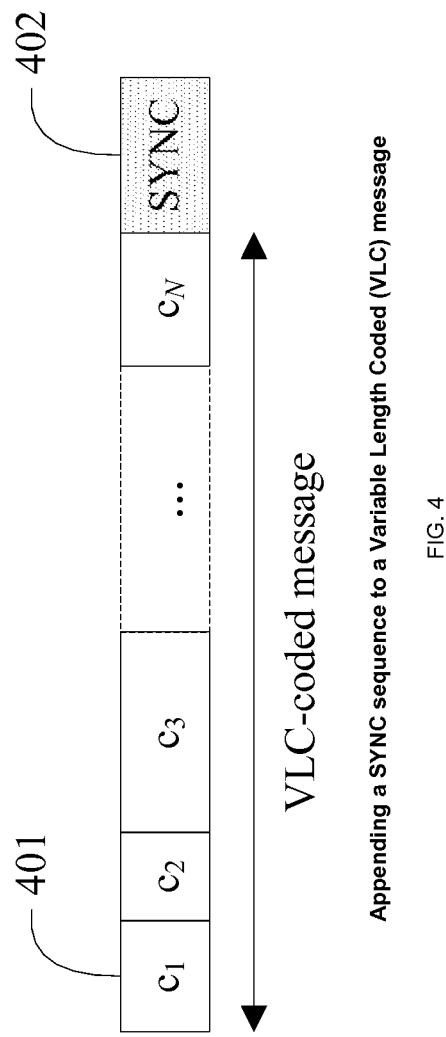
FIG. 4 shows a synchronization sequence (SYNC, 402) placed at the end of the VLC bit stream in accordance with certain embodiments of the present invention.

One of these synchronization sequences is appended at the end of the source message depending on the source message weight. If the weight is an even number, Sync_Seq#1 is appended, and if the weight is an odd number, Sync_Seq#2 is appended. The source message with a SYNC sequence appended at the end is shown in FIG. 4. Block 401 indicates the first codeword in the VLC-coded message, and block 402 indicates the SYNC sequence.

The following example illustrates how this alternating SYNC synchronization technique helps with decoding. Consider the case where the source message weight is 10. Since this weight is an even number, Sync_Seq#1 is appended to the end of the source message and transmitted to the receiver. At the receiver, the decoder runs a defined decoding algorithm (e.g., M-Algorithm) and generates a number of possible source sequences (also referred to as paths) that could correspond to the received sequence. Now consider three different cases with and without synchronization sequences:

No Synchronization Sequence: In this case, the decoder outputs the path with the highest metric, typically MAP or Maximum Likelihood (ML) path, depending on the metric employed. This is the top path in the sorted list of paths at the end of decoding. The top-ranked path will be output regardless of whether or not it has the correct path length and also regardless of whether or not it has the correct weight.

Non-Alternating Synchronization Sequence: This case is similar to the low complexity mono MPEG-4 AAC scenario mentioned above, where the known 3-bit sequence 000 follows the scalefactor field. In this case, the decoder correlates the bits following the end of each surviving path with the known synchronization sequence, and then updates the metrics of surviving paths accordingly. If the top-ranked path has the correct length, then the synchronization sequence is located immediately following its end, which leads to a high correlation value. Hence, the path will stay on top of the list, unless there were errors in the synchronization sequence. Otherwise, if its length is wrong, the correlation value will be lower and the path may move down the list. In general, the path metrics of paths with correct bit length will be enhanced with matching SYNC sequence at the end, while path metrics corresponding to wrong bit length will be suppressed.

Alternating Synchronization Sequences: In this case, the decoder calculates the weight of each surviving path and then correlates four bits following the end of the path with the corresponding synchronization sequence. If the path weight is an even number (even parity), the four bits following the end of the path are correlated against Sync_Seq#1, and if the path weight is an odd number (odd parity), the bits are correlated against Sync_Seq#2. Path metric is then updated according to the correlation value. In this case, the top-ranked path will remain at the top of the list after metric update only if both of the following conditions are satisfied: (i) it has the correct bit length, and (ii) its weight has the same parity (odd or even) as the correct path. If any one (or both) of the conditions above is not satisfied, it is possible that the top-ranked path moves down the list after metric update. Thus, in addition to the path length differentiation, the approach with two SYNCs promotes or demotes paths, respectively, with correct or incorrect weight (parity).

This alternating SYNC technique turns out to be very effective, especially when entropy-achieving source codes are used for compression. Entropy-achieving codes like Huffman codes usually have weak distance properties. Minimum distances as low as 1 or 2 are frequently observed even between relatively long sequences. This is the case with scalefactor data in MPEG-4 AAC that are used in several embodiments as an example. Therefore, at high channel signal-to-noise ratios (SNR), where the channel produces only a few errors, these few errors often cause an incorrect detection of the source message such that a decoded message may have a Hamming distance of 1 or 2 bits from the correct message. In cases where weight-1 error patterns are dominant, alternating synchronization sequences will help suppress these weight-1 error patterns and correct a significant fraction of erroneous packets.

Figure 8:
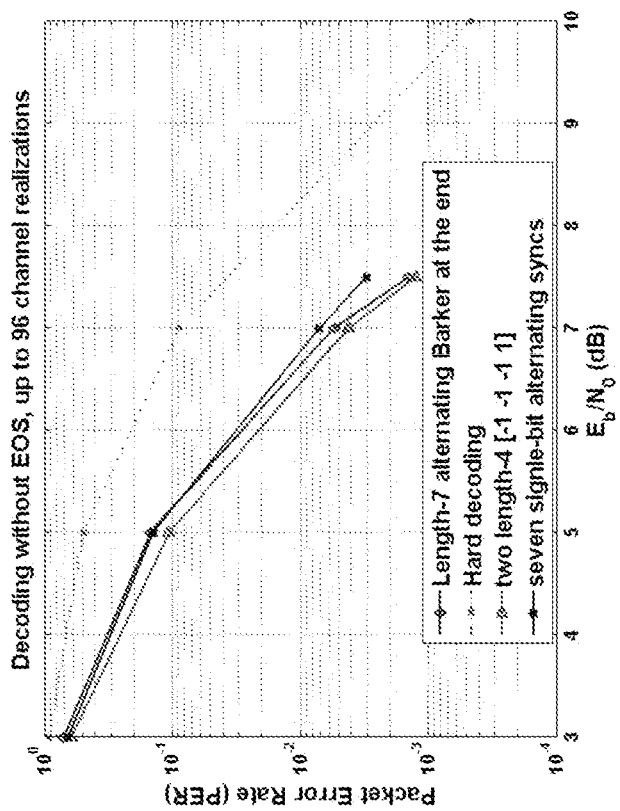
FIG. 8 shows the effect of alternating synchronization sequences by comparing three cases in accordance with certain embodiments of the present invention: (i) one alternating synchronization sequence at the end of the source message, (ii) two synchronization sequences in the middle and at the end of the source message, and (iii) seven single-bit parity check bits, located at every 1/7-th of the source message.

FIG. 8 shows an example of scalefactor data decoding in MPEG-4 Advanced Audio Coding (AAC). The scalefactors are encoded by a Huffman code that has 121 codewords. Each source message consists of a variable number of symbols and the bit length of the source message is a variable number with values typically distributed between 100 and 200 bits. Without a loss of generality, the decoder applies soft-input soft-output (SISO) M-Algorithm decoding with M=30 paths preserved at each stage. Alternatively, various other SISO decoding algorithms, such as LogMAP, sequential, etc., as known in the art, could be employed. FIG. 8 illustrates and compares the packet-error rate (PER) of various schemes using alternating synchronization sequences, where "packet" refers to source message consisting of a sequence of symbols. The curves for Hard decoding and Length-7 alternating Barker SYNC at the end (marked by Diamonds) are relevant to this exemplary embodiment; other curves will be discussed in subsequent embodiments. The curve marked by Diamonds corresponds to a scheme where one length-7 alternating synchronization sequence is appended at the end of the source message. For the length-7 alternating sequences, the system employs the length-7 Barker sequence and its inverse, as shown in Table I. From FIG. 8, one can observe about 1.5 dB gain at PER of $2\times10^{-2}$ compared to the Hard decoding scheme. Because of different slopes of the two curves, higher gains would be achieved at higher signal-to-noise ratio (SNR) values. Assuming an average source message length of 115 bits, the scheme with length-7 alternating synchronization sequence could be interpreted as a forward error correction (FEC) scheme with rate 115/(115+7)=0.94. (Note that no actual FEC module, module 204 in FIG. 2, is involved in this example). In view of such high code rate, the gain of 1.5 dB achieved at PER of $2\times10^{-2}$ by this alternating synchronization scheme is considered to be significant.

TABLE I

Length-7 Barker sequence and its invert, applied as the alternating synchronization sequences at the end of the source message.

| Source message weight | SYNC |
|---|---|
| EVEN | [+1, +1, +1, −1, −1, +1, −1] |
| ODD | [−1, −1, −1, +1, +1, −1, +1] |

Figure 9:
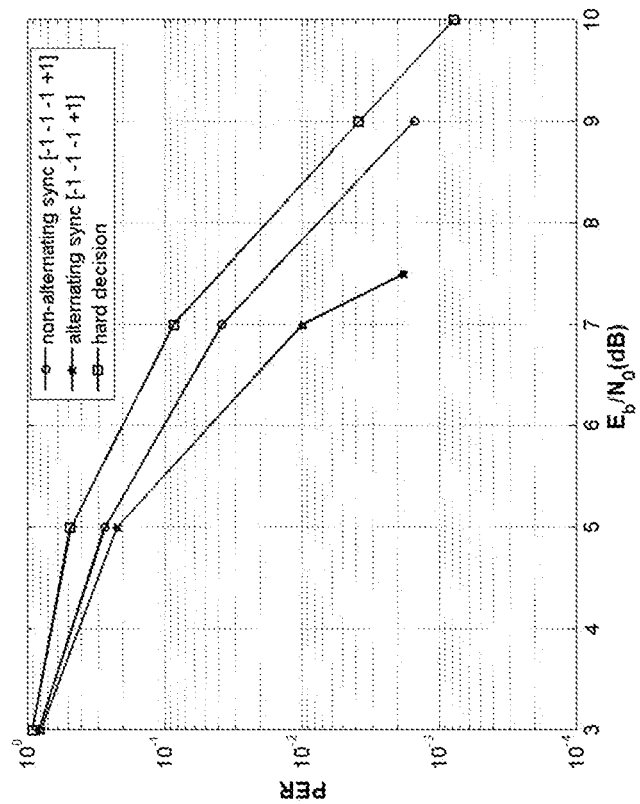
FIG. 9 compares the Packet Error Rate (PER) performance achieved by non-alternating and alternating synchronization sequences in accordance with certain embodiments of the present invention.

FIG. 9 illustrates the advantage of employing alternating SYNC sequences by comparing the gains achieved by a single (fixed) non-alternating SYNC sequence [−1, −1, −1, +1] and a single alternating SYNC sequence chosen from the length-4 Barker sequences in Table II, according to packet weight. In both cases, a length-4 synchronization sequence is employed, resulting in the same overhead for both alternating and non-alternating schemes. It can be observed that the alternating scheme outperforms the non-alternating scheme by a considerable margin. At PER of $10^{-2}$, the non-alternating and alternating schemes achieve, respectively, 0.5 dB and 1.3 dB gain compared to a hard decision scheme. This suggests that less than half of the gain comes from synchronization and more than half of the gain comes from alternation, i.e., from exploiting the source sequence weight. At PER of $10^{-2}$, the alternating scheme performs 0.8 dB better than the nor-alternating scheme. That is, for the same fractional overhead, with slightly higher computational complexity a significant gain is achieved It may be seen from FIG. 9 that the gain of the alternating scheme with respect to the non-alternating scheme as well as the hard decision scheme increases with decreasing PER. At PER of $2\times10^2$, the alternating scheme achieves 1.3 dB gain compared to non-alternating scheme and about 1.8 dB gain compared to the hard decision scheme. Also, the alternating scheme described herein exhibits increasing gains toward higher values of SNR, while the gain of the non-alternating scheme with respect to the hard-decision scheme does not increase at higher SNR, as evidenced by the parallel slopes of PER curves. The gain of the non-alternating scheme compared to the hard decision scheme is 0.5 dB at both PERs of $10^{-2}$ and $2\times10^{-2}$. However, the gain of the alternating scheme compared to the hard decision scheme does increase towards higher SNR. This gain is 0.8 dB and 1.3 dB for PERs of $10^{-2}$ and $2\times10^{-2}$, respectively. This increase in gain is due to the fact that unlike the non-alternating SYNC scheme, the alternating SYNC scheme is an error correction scheme resulting from different synchronization sequences for different packet weights. Thus, this exemplary embodiment, in addition to synchronization enhancement, provides forward error correction capability without introducing any additional overhead beyond the overhead used for synchronization enhancement.

TABLE II

Length-4 Barker sequence and its invert, applied
as the alternating synchronization sequences in
the middle and at the end of the source message.

| Source message weight | SYNC |
|---|---|
| EVEN | [−1, −1, −1, +1] |
| ODD | [+1, +1, +1, −1] |

Figure 10:
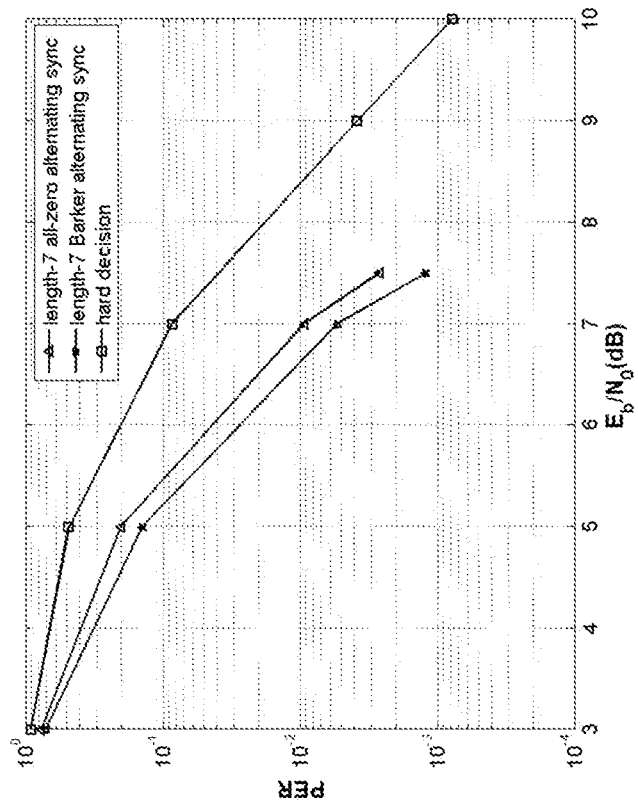
FIG. 10 illustrates the impact of proper synchronization sequence selection by comparing PER performance with different length-7 alternating synchronization sequences in accordance with certain embodiments of the present invention.

FIG. 10 shows that by properly choosing the synchronization sequence, one could maximize the gain achieved by an alternating synchronization scheme. In FIG. 10, two systems are considered, both applying alternating synchronization sequences of length 7 at the end of the scalefactor block. However, the first scheme applies an alternating sequence consisting of either all −1's, or all +1's (depending on packet weight), whereas the second scheme applies a length-7 Barker sequence and its inverse (Table I) as the alternating synchronization sequences. That is, in both cases, the Hamming distance between the two sequences in the set is 7, but Barker sequences have better autocorrelation properties to differentiate from asynchronous paths/sequences in the decoder. Alternatively, instead of Barker sequence, Willard sequences or other sequences with good autocorrelation properties known in the art could be employed. In FIG. 10, it can be observed that at PER of $3 \times 10^{-2}$, the second scheme that is applying the Barker sequence achieves a 0.3 dB gain relative to the first scheme. At this PER, the first scheme achieves 1.6 dB gain compared to the hard decision scheme, whereas the second scheme with alternating Barker synchronization sequence achieves 1.9 dB gain compared to the hard decision scheme. The observation is that proper choice of synchronization sequences helps to increase the gain achieved by applying the alternating synchronization scheme, without increasing fractional overhead or computational complexity. For a particular source code defined by the set of symbols and their probabilities, one could find optimal selection of SYNC sequences such as to maximize the decoding gain. This could be achieved by distance or correlation analysis, or by simulation.

Figure 11:
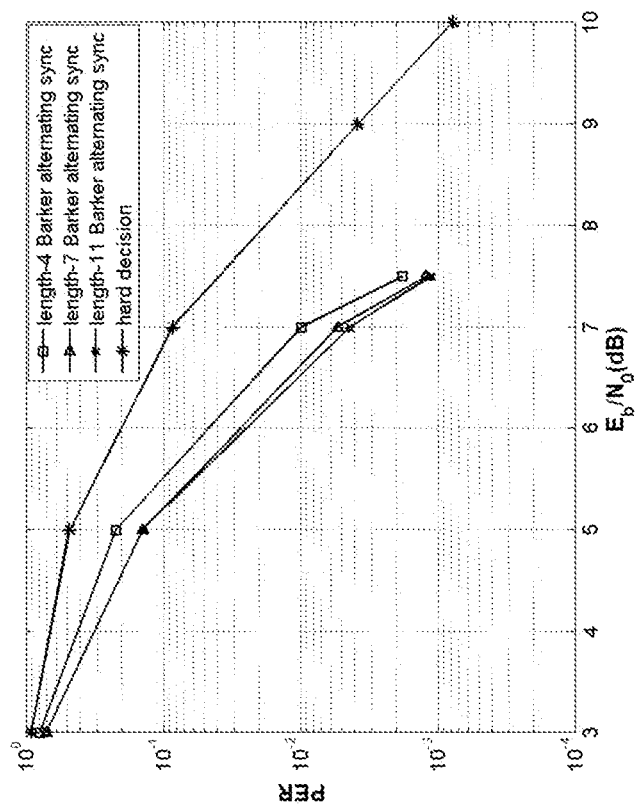
FIG. 11 shows PER performance of alternating synchronization sequences with different lengths in accordance with certain embodiments of the present invention.

FIG. 11 considers the effect of increasing the length of the synchronization sequence on the gain achieved by an alternating synchronization scheme. It shows the comparison among schemes that employ alternating Barker synchronization sequences of length-4, length-7, and length-11, and their corresponding inverses. It could be seen that at PER of $10^{-2}$, these synchronization schemes achieve, respectively, 1.3 dB, 1.6 dB and 1.7 dB gain compared to the hard decision scheme. That is, by increasing the length of synchronization sequence from 4 to 7 bits (i.e., by adding 3 more synchronization bits, or increasing the overhead by 75%) about 0.3 dB of additional gain is obtained. However, by further increasing the length to 11 bits (i.e., by adding 4 more synchronization bits), only 0.1 dB of additional gain is achieved compared to the length-7 scheme, that is, a diminishing gain. In fact, if one considers the excess power required to transmit the synchronization bits, the length-7 scheme yields a better gain than the length-11 scheme. For the scalefactor data with an average packet length of 110 bits, the excess power required to transmit 4, 7, and 11 synchronization bits is 0.15 dB, 0.27 dB, and 0.41 dB, respectively. It is observed that by increasing the length of synchronization sequence from 7 bits to 11 bits, the required excess power is 0.14 dB, whereas the achieved additional gain is only 0.1 dB. In other words, an overall power loss of about 0.04 dB is incurred by switching from length-7 to length-11 alternating synchronization sequence scheme. The above discussion suggests that there is an optimal length for synchronization sequences, e.g., length-7 in the example presented in FIG. 11.

The method of alternating synchronization can be applied to any VLC-coded field in the MPEG-4 AAC frame (FIG. 3), as well as multiple fields in the same frame. Clearly, it can also be applied to any other system where VLC coding is used such as MPEG-1, MPEG-2, MPEG-4, H.261, H.263, H.264, etc., or systems where fixed-length coding is used, such as ISO 8859-15, UTF-32/UCS-4, etc.

Figure 5:
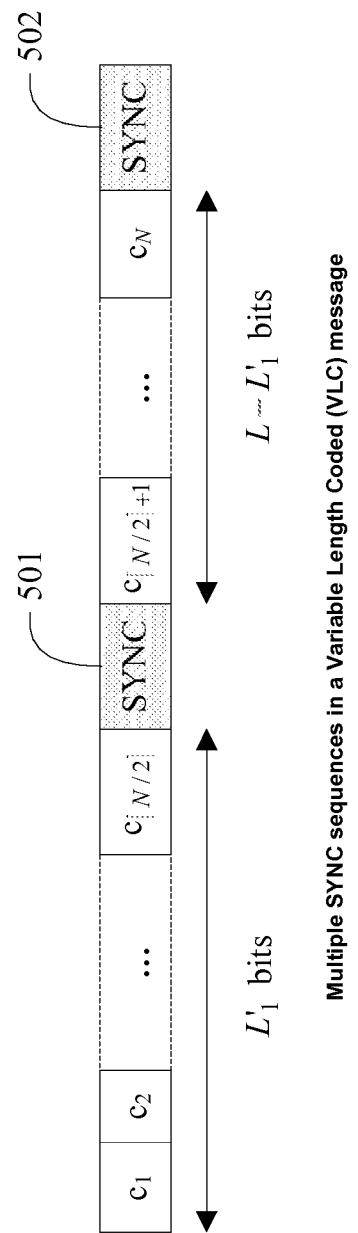
FIG. 5 shows two synchronization sequences (501 and 502) in the VLC bit stream in accordance with certain embodiments of the present invention. One of them (501) is placed within the bit stream, and the other (502) is placed at the end of the bit stream.

In other embodiments, synchronization sequences are applied not only at the end of the source message, but also within the source message, i.e., by partitioning the source message into several segments and placing a synchronization sequence at the end of each segment. Applying additional synchronization sequences within the source message will help the decoder to make a better decision about surviving paths at each stage of the decoding algorithm. This may be especially advantageous for the family of sequence decoding algorithms that keep only a fraction of best paths at each stage. Consider a source message consisting of N symbols, where each symbol is mapped to a binary codeword from a codebook of a variable-length code (e.g., Huffman code). Let the length of the source message be L bits. Now, consider two different paths: (i) the correct path, i.e., the path consisting of the N symbols of the transmitted source message, and (ii) a path different from the correct path, also consisting of N symbols and L bits. Using a non-alternating synchronization sequence only at the end of the source message, as in FIG. 4, path (ii) will not be suppressed, because it has the correct path length. Consider that instead of adding only one non-alternating synchronization sequence at the end of the source message, the encoder adds two non-alternating synchronization sequences—one at the end of the source message, and the other in the middle, e.g., after $\lceil N/2 \rceil$ symbols, where $\lceil N/2 \rceil$ is the smallest integer no smaller than N/2. This situation is illustrated in FIG. 5, where 501 indicates the SYNC sequence in the middle of the source message, and 502 indicates the SYNC sequence at the end. The decoder expects to find synchronization sequences at these two positions: after $\lceil N/2 \rceil$ symbols, and at the end. Let us define the following lengths: L'1, the length of the segment corresponding to the first $\lceil N/2 \rceil$ symbols of the correct path; and L'2, the length of the segment corresponding to the first $\lceil N/2 \rceil$ symbols of the competing path (path (ii)). As assumed earlier, both paths have a total length of L bits, i.e., synchronization sequence at the end will not suppress the competing path; however, if L'1≠L'2, then the synchronization sequence in the middle of the source message will penalize the competing path for having the incorrect length for the first segment.

The above-mentioned technique can be extended to a larger number of synchronization sequences at different positions in the source message. For example, one could have 3 synchronization sequences in every ⅓ of the source message.

Additional gains can be achieved by replacing the non-alternating synchronization sequences by alternating synchronization sequences as employed in other embodiments. For example, in the example above with two synchronization sequences in the middle and at the end of the source message, instead of the two non-alternating synchronization sequences, two alternating synchronization sequences could be employed. In this case, each alternating synchronization sequence is chosen based on the weight of the corresponding segment. By applying these two alternating sequences, the competing path (path (ii)) is suppressed if any one or more of the three conditions below occur:

$L'_1 \neq L'_2$, i.e., the competing path has incorrect length.

First segment of the competing path has the wrong weight (e.g., the correct segment weight is even but the competing path segment has an odd weight).

Second segment of the competing path has a wrong weight.

For a better understanding of the error correction capabilities of the alternating synchronization sequences in the middle, consider high channel SNR scenarios, where the low-weight error patterns are dominant. Consider the following two schemes: Scheme1, where one alternating synchronization sequence is applied at the end of the source message, and Scheme2, where two alternating synchronization sequences are applied, one in the middle and one at the end of the source message. The error-correcting capabilities of Scheme1 and Scheme2 are compared in the following situations:

(i) A weight-1 error occurs: in this case, both Scheme1 and Scheme2 will detect the error and will suppress the error pattern.

(ii) A weight-2 error occurs: in this case, Scheme1 will not detect the error. However, Scheme2 will detect the error if one of the two errors occurs in the first segment and the other error occurs in the second segment of the source message.

Thus, adding alternating synchronization sequences in the middle will improve decoder's performance by increasing both the ability of detecting paths with incorrect segment length, and incorrect segment weight.

Alternatively, more than two alternating synchronization sequences could be employed, each located at the end of one of the segments of a source message. This will further improve the capability of detecting incorrect segment lengths and incorrect segment weights, as explained above.

FIG. 8 shows the performance of two schemes relevant to the present embodiments: Scheme (i), employing a single length-7 Barker SYNC sequence at the end of the source message (curve indicated by Diamonds), and Scheme (ii), employing two length-4 Barker SYNC sequences—one in the middle and one at the end of the source message (curve indicated by Triangles). By comparing the two curves, one could observe that the scheme with two synchronization sequences outperforms the scheme with one synchronization sequence, with just slightly higher fractional overhead. As discussed above, this is due to the following two advantages of Scheme (ii) compared to Scheme (i):

Scheme (ii) is capable of detecting paths that have incorrect path lengths at each segment (i.e., incorrect length either for the segment from beginning to the middle of the source message, or for the whole source message), however, Scheme (i) is able to detect incorrect path lengths only for the whole source message. While Scheme (i) itself outperforms hard decoding, synchronization by a fixed (non-alternating) sequence, as well as synchronization by an alternating sequence with relatively weak autocorrelation properties, as shown in FIG. 8, FIG. 9, and FIG. 10, respectively, Scheme (ii) offers even better performance.

Scheme (i) only suppresses odd-weight error patterns. However, Scheme (ii) also suppresses certain even-weight error patterns that have an odd weight in each segment.

Due to the two above-mentioned advantages, Scheme (ii) outperforms Scheme (i) by about 0.3 dB at PER of $10^{-2}$. However, by increasing the channel SNR from 7 dB to 7.5 dB, Scheme (i) shows a faster decay in PER compared to Scheme (ii). This is due the fact that at high SNRs, weight-1 error patterns are dominant. In Scheme (ii) such error patterns are suppressed by one and only one of the two length-4 alternating sequences, i.e., either by the sequence located in the middle of the source message, or by the sequence located at the end of the source message depending on the location where the error has occurred). However, Scheme (i) suppresses weight-1 error patterns by a length-7 sequence, i.e., paths containing weight-1 error patterns are penalized more in case of Scheme (i), and the probability of decoding the correct path will increase. However, in joint source-channel decoding applications, lower range of SNR is of most interest and therefore Scheme (ii) is advantageous in such scenarios.

One additional advantage of using Scheme (ii) is that the synchronization sequences in the middle help the decoder decide which paths to keep and which ones to discard. This will reduce the probability that the decoder discards the correct path in early stages of decoding, and will increase the probability that the correct path stays as one of the paths with highest metrics and survives until the end of decoding.

To help additionally explain the above mentioned situation, Table III shows a comparison of the percentages of cases where the correct path is not one of the surviving paths at the end of decoding, for Scheme (i) and Scheme (ii). From the results in Table III, one could observe that by applying synchronization sequences in the middle of the source message, the percentage of cases where the correct path does not survive will considerably drop. Specifically, for the range of considered channel SNR (3 to 5 dB), applying an additional length-4 synchronization sequence in the middle of the source message will increase the probability of correct path surviving on the list by approximately a factor 1.5-3.

TABLE III

Comparison between capabilities of different schemes in keeping the correct path as one of the surviving paths.

| Percentage of correct path off list | 3 dB | 5 dB |
|---|---|---|
| Length-7 Barker SYNCs - Scheme (i) | 53.60 | 2.90 |
| Two length-4 SYNCs - Scheme (ii) | 34.70 | 1.17 |

As a final comment on FIG. 8, consider the gain achieved by the scheme applying M-Algorithm decoding and alternating synchronization sequences, compared to a scheme that applies hard-decision decoding (dotted curve in FIG. 8). It could be observed that at PER of $10^{-2}$, all schemes outperform hard decision decoding by about 1.5 to 2.0 dB. The gain is even higher at lower PERs. Assuming an average source message length of 115 bits, Scheme (i) can be interpreted as an FEC-coded system with code rate 115/(115+7)=0.940 and Scheme (ii) as an FEC-coded system with code rate 115/(115+8)=0.935. (Note that no actual FEC module, module 204 in FIG. 2, is involved in this example, as FEC capability here is inherent in the design of SYNC sequences). Considering such high code rates, achieving coding gains in the range of 1.5 dB to 2.0 dB, or more at lower values of PER, is significant.

Figure 12:
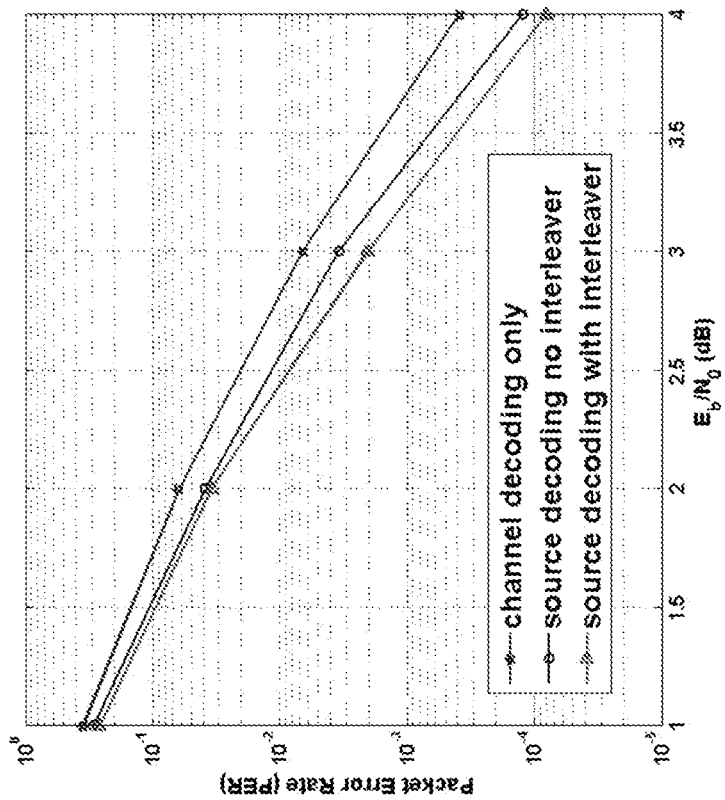
FIG. 12 shows PER performance of length-7 alternating synchronization sequences with rate 2/5 convolutional code, with and without interleaving in accordance with certain embodiments of the present invention.

FIG. 12 shows the performance of alternating synchronization sequences in an FEC-coded system (when modules 204 and 210 in FIG. 2 are present). In FIG. 12 the rate 2/5 convolutional code of constraint length 7 is applied to compressed MPEG-4 AAC scalefactors bit sequence for error protection. Two cases are considered: the decoded performance at the output of the convolutional decoder, and the decoded performance at the output of the source decoder operating on the soft outputs from the convolutional decoder. In this example, the convolutional decoder soft outputs are represented by bit log-likelihood ratios (LLRs). For soft input source decoding, the system employs M-Algorithm with M=30, i.e., 30 paths with highest metrics are kept after each symbol decoding stage. Prior to FEC encoding in the transmitter, two alternating synchronization sequences of length 7 are inserted in the middle and at the end of the source-encoded message, where each alternating synchronization sequence is either an all-one or an all-minus one bit sequence. As shown in other embodiments, suitably chosen sequences with better autocorrelation properties will provide more gain. We also consider two cases, with and without interleaver (202 in FIG. 2) between source encoder and channel encoder at the transmitter, respectively, with and without de-interleaver (212 in FIG. 2) between channel decoder and source decoder at the receiver. In the case with the interleaver, the interleaver is changing randomly for every source message. This is not a practical choice for the interleaver, but will give insight into the average performance of schemes that apply interleaving.

From FIG. 12 one could observe that alternating synchronization sequences will yield an additional gain to channel coding gain. At PER of $10^{-3}$, the schemes with and without interleaving, respectively, achieve about 0.4 dB and 0.6 dB gains relative to channel decoding only. As shown in other embodiments, by optimal choice of alternating SYNC sequences as well as optimal choice of their lengths, larger gains could be achieved. It should be mentioned that in the scheme of FIG. 8 the source decoder outputs the top-ranked path as the decoder output, while in the scheme considered in FIG. 12, the source decoder outputs the list of M paths and a CRC check on all surviving paths is performed to find the correct path. Therefore, if the correct path is among the surviving paths, the source decoder will find it using the CRC checks. CRC encoding and decoding are used as known in the art. It should also be noted that the gains shown in FIG. 12 are for single iteration (i.e., when the feedback between modules 213 and 210 in FIG. 2 is not established). By performing iterative decoding between channel and source decoder, especially for the case with the interleaver, larger gains are achievable. For example, with a single, non-alternating SYNC at the end of packet, at PER of $10^{-4}$, an additional gain of 0.55 dB is observed by employing multiple iterations, compared to a single channel and source decoding iteration, and larger gain at lower PERs and in fading channels were observed.

Figure 13:
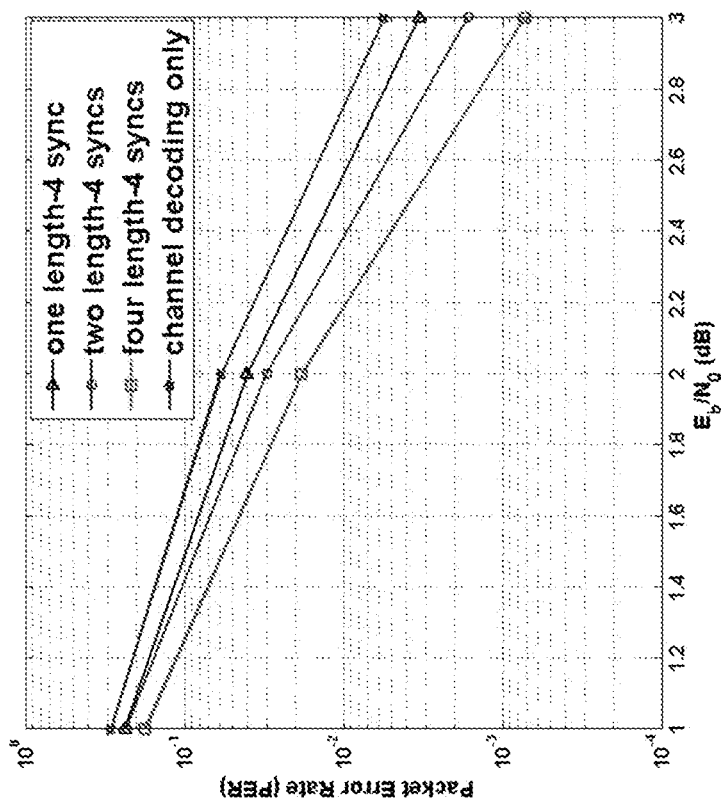
FIG. 13 shows PER performance of alternating SYNCs with rate 2/5 convolutional code in several cases in accordance with certain embodiments of the present invention: one SYNC at the end versus multiple SYNCs spread over the source packet.
Figure 14:
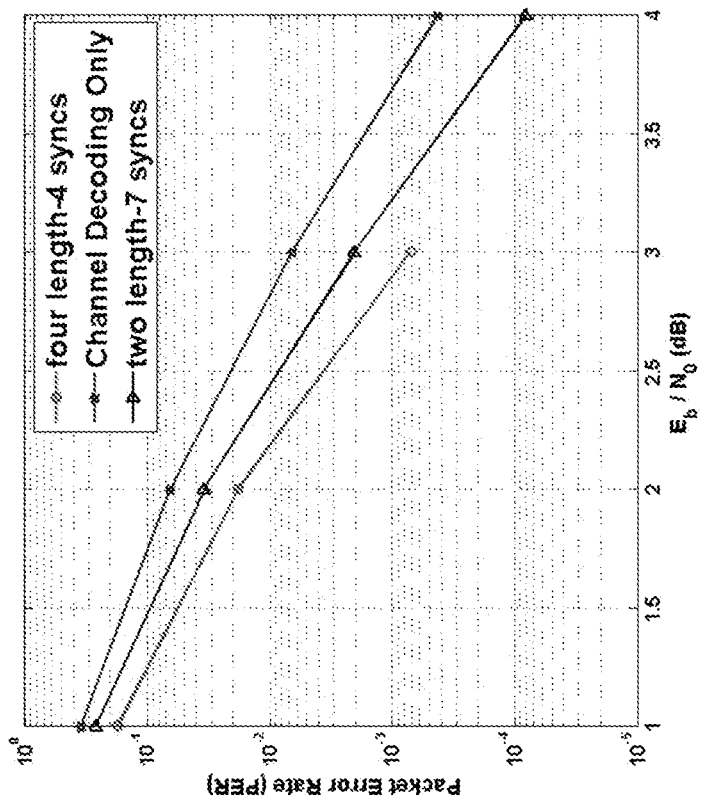
FIG. 14 shows the comparison of two coded schemes that apply two length-7 and four length-4 alternating synchronization sequences in the middle and at the end of source message in accordance with certain embodiments of the present invention.

In FIG. 13, the gain achieved by increasing the number of alternating synchronization sequences that are inserted in the middle of the source sequence is demonstrated. The setup is the same as the setup explained in FIG. 12, except that instead of length-7 alternating synchronization sequences, length-4 sequences are considered, where the alternating sequence is either an all-one or an all minus-one sequence. A random interleaver is applied between source encoder and channel encoder at the transmitter, and the corresponding de-interleaver is applied between channel decoder and source decoder at the receiver. It can be observed from FIG. 13 that by applying one, two, and four alternating synchronization sequences, respectively, gains of 0.2 dB, 0.4 dB, and 0.6 dB at PER of $10^{-2}$ are achieved, compared to the case where only channel decoding is applied. This increase of gain by increasing the number of alternating synchronization sequences is due to two effects: (i) increasing the number of synchronization sequences will increase the probability that the correct path survives until the end of decoding, and (ii) a larger variety of error patterns can be corrected by applying a larger number of alternating synchronization sequences. As demonstrated in other embodiments, larger gains are achievable by optimal selection of SYNC sequences FIG. 14 provides some insight about the proper choice of the number and length of alternating synchronization sequences. In FIG. 14, the curve marked by Stars corresponds to channel decoding only, the one marked by Triangles corresponds to two length-7 alternating synchronization sequences, and the one marked by Circles corresponds to four length-4 alternating synchronization sequences. It should be noticed that although the two schemes introduce almost the same amount of overhead (14 bits and 16 bits, respectively), the scheme that applies four length-4 sequences achieves better gains. For example, at PER of $10^{-2}$, the first scheme achieves a gain of 0.5 dB, and the second scheme achieves a gain of 0.8 dB, compared to the case where only channel decoding is applied. This demonstrates that by examining and combining different strategies in multiple embodiments, one would be able to maximize gains while maintaining the same bit overhead budget for synchronization bits.

As with the previous method, this method can also be applied to any VLC-coded field in the MPEG-4 AAC frame (FIG. 3), as well as multiple fields in the same frame. It can also be applied to any other system where VLC coding is used.

In other embodiments, the effect of alternating synchronization sequences can be further enhanced by employing more than two alternating SYNCs corresponding to more than two sequence weights. For example, Table IV shows how to employ three alternating synchronization sequences corresponding to three sets of sequence weights. As shown in Table IV, the encoder calculates the packet weight and divides the calculated weight by 3. If the remainder is 0, the encoder adds SYNC1 at the end of the source message; if the remainder is 1, it adds SYNC2 at the end; and if the remainder is 2, it adds SYNC3 at the end of the source message. That is, the three sets of sequence weights correspond to weights 0, 1 and 2, modulo-3. At the decoder, the path metrics are modified by adding correlation metric between the SYNC for corresponding sequence weight and bit sequence at the expected SYNC position. If the weights of the correct path and the top-ranked path give the same remainder after dividing by 3, then the top-ranked path is correlated by the correct SYNC and stays at the top of the list. Otherwise, if the weight remainders are different, it means that errors exist in the top-ranked path. In this case, correlation with the SYNC will be low, and the top-ranked path may move down the list and be replaced by the correct path or another surviving path that has the appropriate path weight. By applying such synchronization method, all surviving paths that have error patterns with weights 3w+1, 3w+2, for w=0, 1, 2, . . . , are suppressed. At high SNRs, the most frequently occurring error patterns have weights 1 and 2, and these get suppressed by the scheme described above.

TABLE IV

Detecting weight-1 and weight-2 error patterns by applying 3 alternating synchronization sequences.

| Weight | SYNC |
| --- | --- |
| 3w | SYNC1 |
| 3w + 1 | SYNC2 |
| 3w + 2 | SYNC3 |

Figure 15:
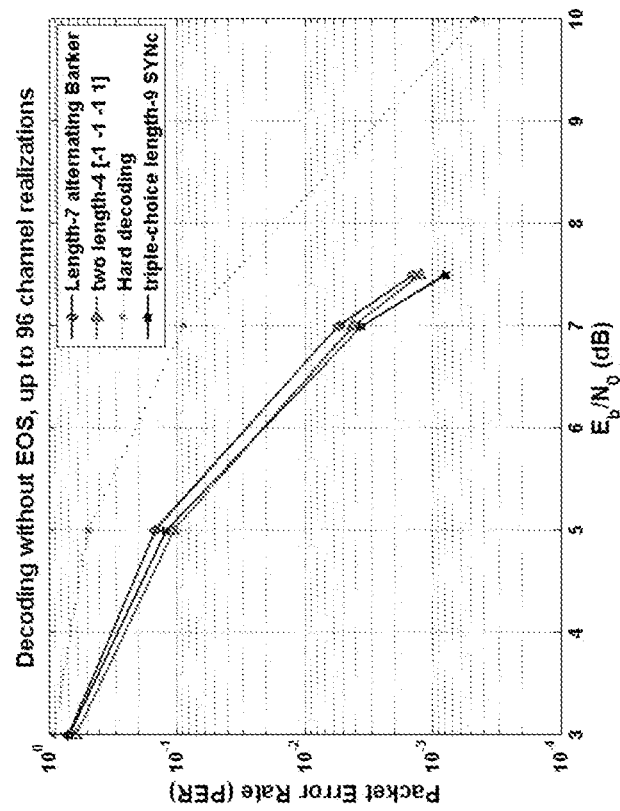
FIG. 15 shows the comparison of two schemes that suppress odd error patterns versus a scheme that uses "triple-choice" alternating synchronization sequences that suppress all error patterns with weights $3w+1$ and $3w+2$, for $w=0, 1, \ldots$ in accordance with certain embodiments of the present invention.

In FIG. 15, the performance of a scheme with length-9 alternating synchronization sequences at the end of the source message is shown by the curve indicated by Stars. The alternating synchronization sequence is designed to correct all weight-1 and weight-2 error patterns. The SYNC dictionary consists of three sequences. The sequences are chosen such that the minimum Hamming distance between them is maximized. These sequences are shown in Table V. All sequences have distance 6 from each other. This scheme will sometimes be referred to as a "triple-choice" scheme, because there are three SYNC sequences in the SYNC dictionary, one for each of the modulo-3 weight remainders.

TABLE V

Dictionary of 3 alternating
synchronization sequences, designed to
suppress all error patterns with weights 1 and 2.

| Weight | SYNC |
|---|---|
| 3w | −1 −1 −1 +1 +1 −1 +1 −1 +1 |
| 3w + 1 | +1 +1 +1 −1 −1 −1 +1 +1 +1 |
| 3w + 2 | −1 +1 −1 +1 −1 +1 −1 +1 −1 |

As shown in FIG. 15, this triple-choice alternating synchronization scheme outperforms both Schemes (i) and (ii) at channel SNRs of 7 dB and higher. This is because this scheme is capable of correcting all weight-1 and weight-2 error patterns that are dominant error patterns at higher channel SNRs. In fact, it may be observed by simulations that at high channel SNRs, most error patterns that are not corrected by Schemes (i) and (ii) are of weight 2. The triple-choice scheme is designed to suppress such error patterns and corrects them in most cases.

Despite its better performance at higher SNRs, the triple-choice scheme is slightly outperformed at lower channel SNRs by the scheme that applies synchronization sequences in the middle of the source message (Scheme (ii), marked by Triangles in FIG. 15). This is due to the capability of the latter scheme (Scheme (ii)) to keep the correct path as one of the surviving paths until the end of decoding (see Table III and related discussion). In other embodiments, multiple weight approach SYNC sequences could be optimized for shorter length. Also, their positioning within the packet could be optimized, with multiple positions chosen, not just at the end of the packet.

Figure 16:
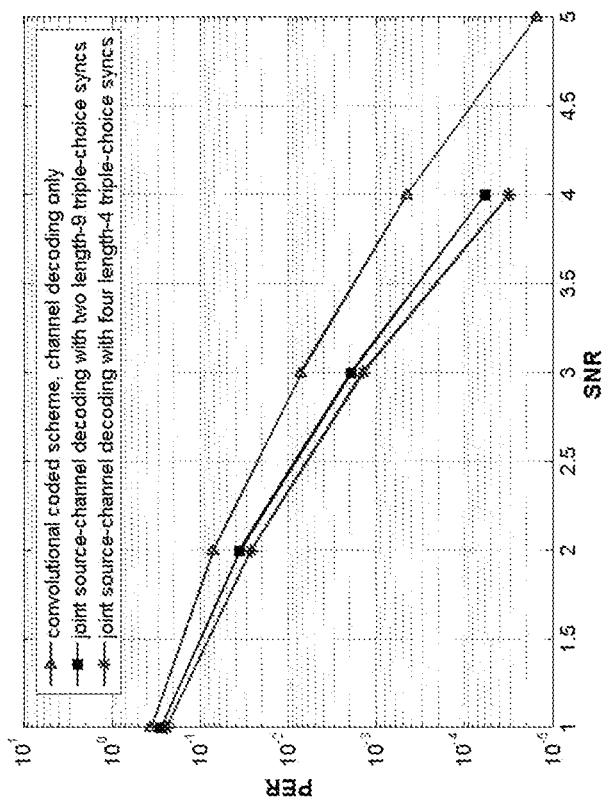
FIG. 16 shows the performance of joint source-channel decoding for convolutional coded schemes with different length synchronization sequences in accordance with certain embodiments of the present invention, where the system is using triple-choice alternating synchronization sequences that suppress all error patterns with weights $3w+1$ and $3w+2$, for $w=0, 1, \ldots$.

FIG. 16 shows the performance of triple-choice alternating synchronization sequence method in a FEC coded systems. In FIG. 16, joint source and channel decoding schemes using the rate 2/5 convolutional code of constraint length 7 is considered. Two different triple-choice alternating synchronization schemes are analyzed. The first scheme applies two length-9 triple-choice SYNC sequences, one in the middle and the other at the end of scalefactor block. The second scheme applies four length-4 triple-choice SYNC sequences, each at every ¼-th of the scalefactor block. The dictionary of the triple-choice length-4 alternating sequence consists of length-4 Barker sequence and its inverse (as shown in Table II), as well as the reverse-order Barker sequence, i.e., [+1, −1, −1, −1]. The first and second sequence in the dictionary have Hamming distance of 4 from each other, whereas the third sequence has Hamming distance of 2 from each of the first two sequences. By comparing the two schemes considered in FIG. 16, one can observe that the second scheme outperforms the first scheme by 0.2 dB at PER of $10^{-4}$. This is despite the fact that the second scheme has a slightly smaller overall length (4×4=16 bits) compared to the first scheme (2×9=18 bits). The second scheme has the ability to suppress more classes of error patterns, e.g., weight-4 error patterns with one bit error at every ¼-th of the block. It also provides more re-synchronization opportunities increasing the probability of keeping the correct path on the list, as discussed in previous embodiments. At PER of $10^{-4}$ the first scheme and the second scheme outperform the scheme based on channel decoding only (i.e., no source decoding) by 0.5 dB and 0.7 dB, respectively. It should be noted that although these simulation results are obtained with a random interleaver between source encoder and channel encoder, iterative decoding is not performed and the results are based on single iteration. Larger gains would be achieved in the case of iterative joint source-channel decoding as demonstrated earlier.

In other embodiments, triple-choice alternating synchronization scheme, can be extended to suppress error patterns with weights 1, 2, . . . , n−1, for any given integer n>3. For this purpose, the dictionary of alternating synchronization sequences is extended to include n sequences. The encoder calculates the remainder of source message weight divided by n, i.e., sequence weight modulo-n and applies the synchronization sequence number i, if the remainder is i−1. For example, to correct error patterns with weights 1, 2, and 3, a dictionary of 4 synchronization sequences, SYNC1, SYNC2, SYNC3, and SYNC4, is needed. If the remainder of the source message weight divided by 4 is 0, SYNC1 is used, and if, for example, the remainder is 3, SYNC4 is used. Otherwise, the decoding method is similar as in these embodiments with three SYNCs corresponding to n=3 sequence weights. In this example, all error patterns with weights 4w+1, 4w+2, 4w+3, for all w=0, 1, . . . , will be suppressed. At high SNRs, most common error patterns to be suppressed are error patterns with weights 1, 2, and 3.

This method can be applied to any VLC-coded field in the MPEG-4 AAC frame (FIG. 3), as well as multiple fields in the same frame. Clearly, it can also be applied to any other system where VLC coding is used.

In yet other embodiments, as a special case of alternating synchronization sequences, one can apply single parity check bits for different segments of the source message. As an example, consider again FIG. 8 and compare Scheme (i) (the curve marked by Diamonds) and Scheme (ii) (the curve marked by Triangles) with Scheme (iii) (the curve marked by Stars), where in Scheme (iii), seven single parity check bits are applied at every ⅐-th of the source message. From FIG. 8 one can observe that at low channel SNRs, i.e., channel SNRs up to 5 dB, Scheme (iii) slightly outperforms Scheme (i). This is due the following facts:

Scheme (iii) provides 7 opportunities to penalize paths with incorrect length at each of the 7 segments; whereas, Scheme (i) only penalizes paths that have incorrect length for the whole path.

Scheme (iii) is potentially capable of correcting more error patterns. For example, if an error pattern of weight-6 occurs, where there is one error in each of the first 6 segments, Scheme (iii) is able to suppress this error pattern. However, such error pattern will not be suppressed by Scheme (i) because such error pattern has an even weight. More generally, Scheme (iii) is able to suppress odd error patterns in each segment and help keep correct path with such error patterns on the list of surviving paths.

Despite its comparable performance (or even slightly better performance) at lower channel SNRs, Scheme (iii) is outperformed by Scheme (i) at higher channel SNRs. At higher channel SNRs, weight-1 error patterns are dominant. Scheme (i) suppresses weight-1 error patterns by a length-7 sequence; however, Scheme (iii) suppresses weight-1 error patterns by a length-1 synchronization sequence (i.e., a single synchronization bit) that is located at the end of the segment containing the erroneous bit. Since Scheme (i) penalizes the weight-1 error patterns considerably more than Scheme (iii), Scheme (i) has a better potential to suppress incorrect paths and decode the correct path at high SNRs.

Alternatively, in other embodiments, alternating synchronization sequences may have non-uniform spacing, such that they are located at non-equal distances from each other. For example, when applying 3 alternating synchronization sequences, one may apply the first sequence after ½ of the source symbols/bits, the second sequence after ⅗-ths of the symbols/bits, and the third sequence at the end of the source message.

Alternatively, in other embodiments, one may apply alternating sequences with different lengths at different locations of the source message. For example, when applying two alternating synchronization sequences, one may apply a length-7 sequence in the middle and a length-4 sequence at the end of the source message, or vice versa.

Figure 17:
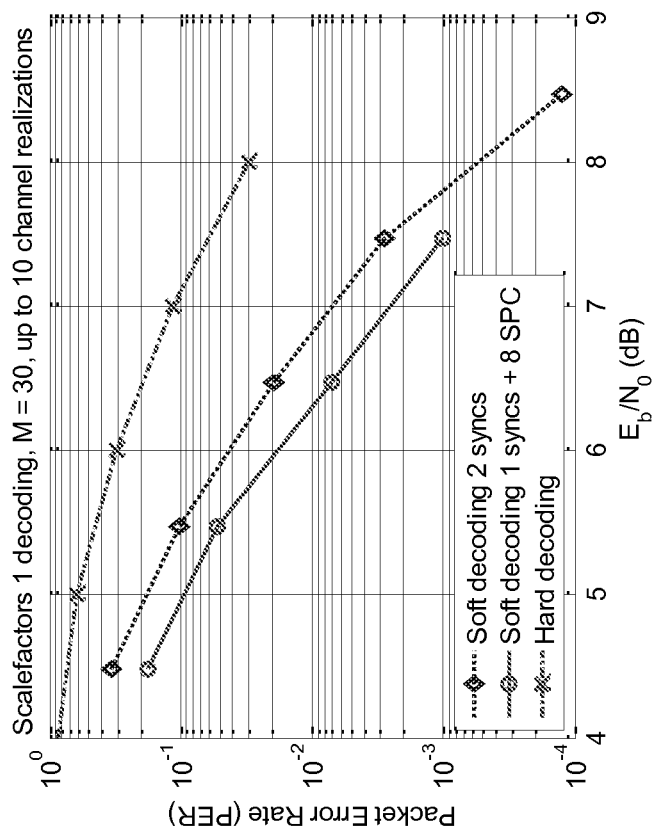
FIG. 17 shows the comparison of decoding performance between a scheme using two Hamming (8,4) SYNCs and a scheme using one Hamming (8,4) SYNC plus 8 single parity check (SPC) bits in accordance with certain embodiments of the present invention.

Alternatively, in other embodiments, one may apply different types of alternating sequences (in terms of maximum weight of error patterns that they could suppress) at different locations of the source message. For example, one may apply a triple-choice alternating sequence (e.g., the one given in Table V) in the middle, and a "double-choice" synchronization sequence (e.g., Table II) at the end of the source message. Such combined use of SYNC sequences with different error (weight) suppression capabilities may sometimes be referred to as "mixed-type" alternating SYNC scheme, whereas using the same type of sequence at one or multiple positions, as described in some of the previous embodiments, may be referred to as "single-type" alternating SYNC scheme. For the same amount of overhead, combining synchronization sequences of different types and lengths may provide better performance than using sequences of one type and length only. As an example, consider the following two schemes: Scheme (i) that uses two 8-bit synchronization sequences from the Hamming (8,4) code shown in Table VI, one in the middle and one at the end of the bit stream (as shown in FIG. 5) and Scheme (ii) that uses 8 Single Parity Check (SPC) bits, each at ⅛-th of the bit stream, plus one 8-bit Hamming sequence at the end. Both schemes have exactly the same amount of overhead—16 bits. Their performance on scalefactor decoding is shown in FIG. 17. As can be seen from the figure, even though the two schemes have exactly the same overhead, Scheme (ii) yields a 0.5 dB gain compared to Scheme (i) at a PER of $2\times10^{-2}$. This is because Scheme (i) has only two re-synchronization points in the bit stream that are, e.g., on average 60 bits apart, for the average length of the scalefactor field of 120 bits. Even a single bit error between these synchronization points may cause the correct path to fall off the list, if it occurs far enough from the next synchronization point. Scheme (ii), however, offers a synchronization point every ⅛-th of the bit stream, or every 15 bits on average, so the chance of the correct path falling off the list due to a single bit error is reduced

TABLE VI

Dictionary of synchronization sequences based on the Hamming (8,4) code.

| Weight | SYNC |
|---|---|
| 16w | +1 +1 +1 +1 +1 +1 +1 +1 |
| 16w + 1 | +1 +1 +1 −1 +1 −1 −1 −1 |
| 16w + 2 | +1 +1 −1 +1 −1 +1 −1 −1 |
| 16w + 3 | +1 +1 −1 −1 −1 −1 +1 +1 |
| 16w + 4 | +1 −1 +1 +1 −1 −1 +1 −1 |
| 16w + 5 | +1 −1 +1 −1 −1 +1 −1 +1 |
| 16w + 6 | +1 −1 −1 +1 +1 −1 −1 +1 |
| 16w + 7 | +1 −1 −1 −1 +1 +1 +1 −1 |
| 16w + 8 | −1 +1 +1 +1 −1 −1 −1 +1 |
| 16w + 9 | −1 +1 +1 −1 −1 +1 +1 −1 |
| 16w + 10 | −1 +1 −1 +1 +1 −1 +1 −1 |
| 16w + 11 | −1 +1 −1 −1 +1 +1 −1 +1 |
| 16w + 12 | −1 −1 +1 +1 +1 +1 −1 −1 |
| 16w + 13 | −1 −1 +1 −1 +1 −1 +1 +1 |
| 16w + 14 | −1 −1 −1 +1 −1 +1 +1 +1 |
| 16w + 15 | −1 −1 −1 −1 −1 −1 −1 −1 |

Alternatively, in other embodiments, one may apply a combination of non-alternating and alternating synchronization sequences. For example, one may apply a non-alternating sequence in the middle and an alternating sequence at the end of source message.

Alternatively, in other embodiments, one may apply a combination of two or more of features described in previous embodiments to satisfy system requirements for different digital communications systems with optimal performance complexity trade-off. For example, one may apply a larger number of synchronization sequences and/or more powerful/longer sequences in the earlier parts of the MPEG-4 AAC bit stream (FIG. 3), which are known in the art to be more important for perceptual audio quality, and fewer sequences (or shorter sequences) in the latter parts of the bit stream.

In other embodiments, separate CRC codes are provided for more protected and less protected parts of the source sequence, respectively, to facilitate better unequal error protection and error concealment. For example, earlier parts of MPEG-4 AAC packets, e.g., ICS, section data and scalefactor fields, say subpacket A, could be more protected by source sequence augmentation methods described in other embodiments, while the latter parts, subpacket B, could be less protected or without additional source sequence augmentation. Then subpackets A and B are protected separately by CRC codes CRCA and CRCB, respectively, wherein CRC codes CRCA and CRCB may also have different strengths depending on the desired probability of undetected errors for subpackets A and B. Since subpacket A will have lower packet error probability, on average, than subpacket B, whenever it happens that subpacket A is correct and subpacket B is incorrect, the error concealment will be used only for less important data in subpacket B.

Additionally, in stereo or multichannel MPEG-4 AAC packets, unequal CRC and/or augmentation protection may be applied on each channel. For example, the more important parts in channel 1, such as ICS, section data and scalefactors, referred to as subpacket A1, could be protected by more powerful CRC and/or sequence augmentation, while the less important parts of channel 1, referred to as subpacket B1, could be protected by less powerful CRC and/or sequence augmentation. To facilitate the detection of the start of channel 2, a SYNC sequence may be placed at the end of channel 1 bit stream. Within channel 2 bit stream, one may again distinguish the more important part (subpacket A2), which is protected using more powerful CRC and/or sequence augmentation, and the less important part (subpacket B2), which is protected using less powerful CRC and/or sequence augmentation. With this arrangement, the more important parts of both channels (subpackets A1 and A2) will have lower error probabilities than the less important parts (subpackets B1 and B2), which will facilitate error concealment in the less important parts.

Additionally, one may distinguish more than two levels of importance within each audio channel, and apply unequal CRC and/or augmentation protection on each part of the bit stream according to the importance of that part of the bit stream in order to achieve the desired performance.

Figure 18:
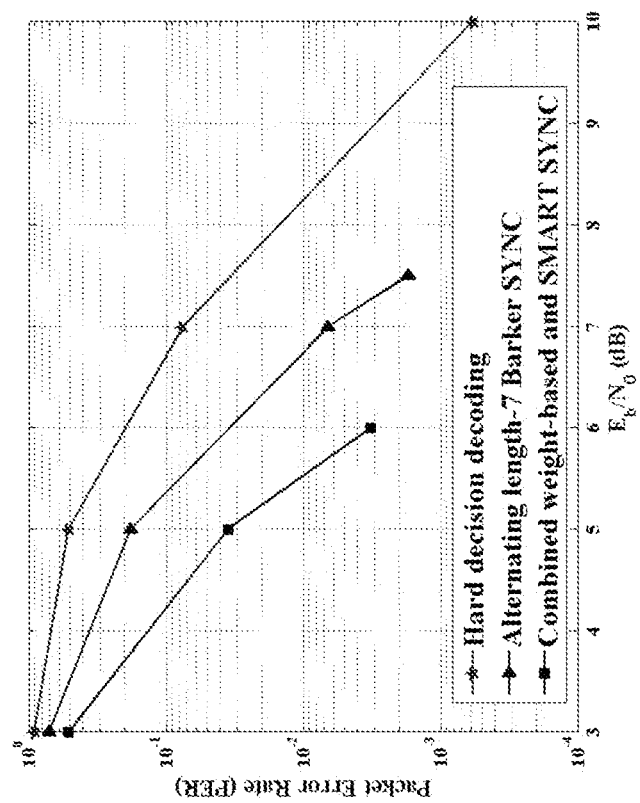
FIG. 18 shows the comparison of decoding performance with alternating Barker SYNCs and "smart" SYNCs in accordance with certain embodiments of the present invention.

Alternatively, in other embodiments, one may apply SYNCs in a "smarter" way by tailoring the SYNC bits to the properties of the specific encoded source sequences. In the previously described embodiments, SYNCs were chosen based on one attribute of the source sequence, namely the sequence weight. However, it is also possible to utilize other attributes of the source message in SYNC sequence selection. For example, for the scalefactors in MPEG-4 AAC encoded bit streams, the most frequent symbols are 59, 60, and 61. In one approach, some sync bits could be dedicated to correspond to the count of the number of one or more of these symbols, or others in addition, within the scalefactor field. Also, the codewords of some symbols in the vicinity of symbol 60 are at Hamming distance 1 from each other (e.g., the codewords of symbols 57 and 63). Therefore, a single bit error could result in erroneous symbol decision. To detect such errors, some sync bits could be used to identify the number of rising edges or falling edges, or both, in the symbol sequence. For example, if the current symbol is 60 and the next symbol is 63, number 3 is added to the rising edge count. If the decoder decodes symbol 57 instead of 63, due to one bit error, number 3 will be added (|60−57|=3) to the falling edge count. Therefore, both rising edge count and falling edge count will differ by 3 from the original rising and falling edge counts and SYNCs will detect this mismatch. To represent rising and falling edge counts with a finite, relatively small number of bits, say q bits, modulo-($2^q$) operation could be applied to the total count. To provide better resolution, one could also encode the peak value and the location of the peak symbol within the scalefactor field. Details of an exemplary embodiment of assigning bits to different fields of the "smart" SYNC is shown in Table VII. The 12 assigned bits are further encoded using a (12,24) Golay code and are added as the synchronization sequence to the end of the scalefactor field. Simulation results using this "smart" SYNC are shown in FIG. 18. After considering the power loss due adding synchronization bits, the "smart" Golay SYNC achieves a coding gain of 2.1 dB compared to Hard decision decoding scheme. This is 0.7 dB better than length-7 double-choice alternating Barker SYNCs that achieve a coding gain of 1.4 dB after considering the power loss due adding 7 synchronization bits. Most of this additional gain is due to including additional source sequence attributes that constitute "smart" SYNC property, as it was demonstrated in a previous embodiment that simple increase of SYNC length provides diminishing return and may eventually degrade coding gain when power efficiency is accounted for, and that length-7 was better than length-9 SYNC. Thus, in this embodiment, different attributes of the source sequence could be advantageously encoded into SYNC sequences to provide additional gains. Various combinations of source sequence attributes as well as SYNC lengths could be employed to achieve desired performance-overhead trade-offs.

The above embodiments were described for the scenario where the input to the source decoder consists of soft bits, as in FIG. 2, which essentially means that the source decoder operates at the physical layer or that soft bits are passed to the layer where source decoding is performed. In this case, both single-iteration and multiple-iteration solutions are possible. In addition, all of the above embodiments can also be realized in a scenario where the source decoder operates at the application layer and accepts hard bits, similarly to FIG. 1. In this case, the output of the channel decoder still contains residual bit errors, which may cause incorrect source decoding. Hence, sequential source decoding (using, for example, the stack algorithm or the M-algorithm) with an appropriate metric could still benefit from synchronization sequences.

In yet other embodiments, an error detection code is associated with source encoded packet prior to augmenting the source sequence with additional bits and SYNC sequences. Error detection is performed prior to source decoding on the bit sequence stripped of augmenting bits and SYNC sequences at the receiver. If the error detection code indicates that the packet is correct, i.e., error-free, the augmented source decoding is skipped. In case of detected errors, source decoding is performed as described in various embodiments. In some embodiments, a CRC code is used as an error detection code. SISO CRC decoding is employed first on the source sequence stripped of augmenting bits and SYNC sequences, followed by soft input source decoding as described in various embodiments. In iterative joint source-channel decoding, extrinsic information, as known in the art, is passed to the channel decoder for the next iteration. Alternatively, SISO source decoding could be performed first, followed by SISO CRC decoding on the sequence stripped of augmenting bits and SYNC sequences, followed by passing extrinsic information to the channel decoding for the next iteration, if errors are detected by CRC.

The success of Joint Source Channel Decoding (JSCD) depends on the ability of both source and channel decoder to distinguish between valid (permissible) and invalid (impermissible) sequences. Efficient source encoding, however, generates many valid sequences with distance 1 from each other. Consider Huffman coding, for example. Since the Huffman code tree is a complete tree, as known in the art, Huffman decoder is able to interpret any bit sequence, even a random bit sequence. Hence, such source decoder by itself

TABLE VII

Details of "smart" synchronization scheme using Golay code.

| Attribute | Purpose | Number of bits | Encoding details |
|---|---|---|---|
| Weight | Capturing sequence weight | 1 | Calculate number of bits that are equal 1 and take modula-2 |
| Peak value | Capturing maximum symbol value | 3 | Find maximum, subtract from 60, and take modulo 8 |
| Peak position | Capturing position of symbol with maximum value | 2 | Find the symbol position and take modulo 4 |
| Counter of symbol 59 | Capturing number of symbols 59 in the scalefactor sequence | 1 | Count symbols that are equal 59 and take modulo 2 |
| Counter of symbol 61 | Capturing number of symbols 61 in the scalefactor sequence | 1 | Count symbols that are equal 61 and take modulo 2 |
| Rising edge sum | Capturing summation of amplitude changes in rising edges | 2 | Find summation of absolute change in amplitude on rising edges and take modulo 4 |
| Falling edge sum | Capturing summation of amplitude changes in falling edges | 2 | Find summation of absolute change in amplitude on rising edges and take modulo 4 |
| | Total bits: | 12 | | will not provide any gain in JSCD. The methods described in previous paragraphs are able to effectively increase the distance between permissible source sequences, thereby increasing the source decoding gain in JSCD. Performance of such methods was illustrated in terms of decoding of Huffman-coded scalefactor fields in MPEG-4 AAC (blocks 304 and 310 in FIG. 3), and the same procedures are applicable to Huffman-coded spectral data fields (308 and 314 in FIG. 3). However, the principle of increasing the distance between permissible source sequences is applicable to other fields in MPEG-4 AAC frames as well, such as ICS (302), section data (303 and 309), etc. The idea is to exploit the properties and constraints of the source encoder to add some redundancy to the source bit stream in a targeted manner such as to increase the distances between some symbols or fields by using minimum overhead and thereby achieve higher gain than what source-agnostic channel coding would be able to provide for the same amount of redundancy.

Decoding of MPEG-4 AAC Fields

Figure 6:
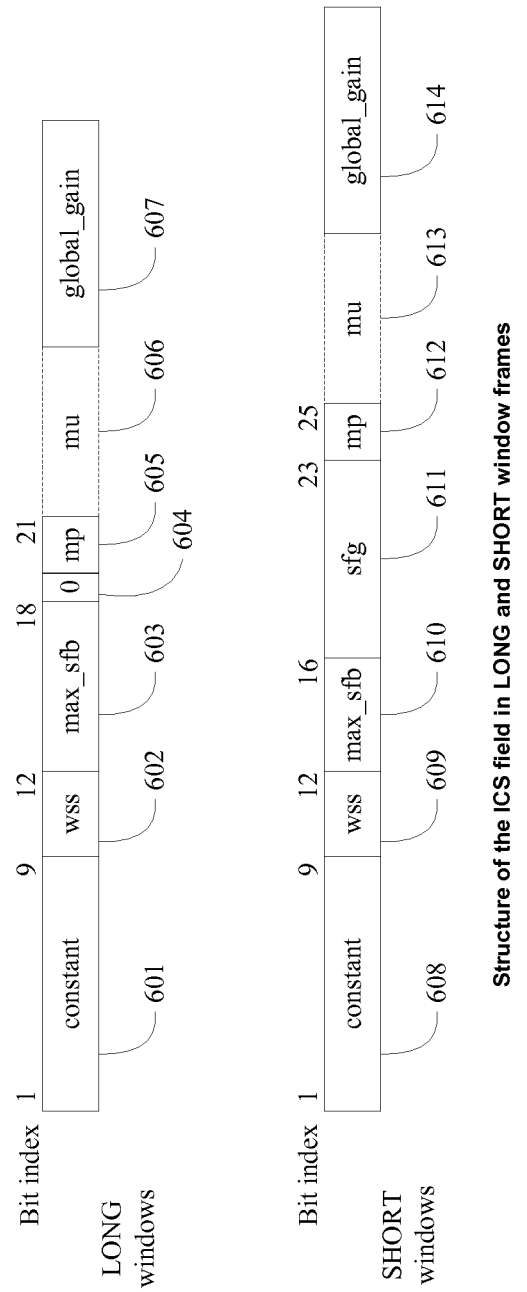
FIG. 6 shows the structure of the Individual Channel Stream (ICS) field in LONG and SHORT MPEG-4 AAC window frames in accordance with certain embodiments of the present invention.

ICS Decoding: Individual sub-fields of the ICS field are shown in FIG. 6. The top part of the figure shows the structure of the ICS field in LONG window sequence frames, while the bottom part shows the structure in the case of SHORT window sequence frames. In both cases, the first 9 bits (blocks 601 and 608) are the same, because they correspond to the data that does not change from frame to frame, such as syntax element ID, reserved bits, etc. For the case of high efficiency stereo MPEG-4 AAC frames, these 9 bits are 001000010. The next two bits specify the window sequence (10 for SHORT; 00, 01, or 11 for LONG), and the bit after that specifies the window shape. Correct decoding of window sequence is crucial for the success of MPEG-4 AAC decoding, because it influences bit stream parsing and interpretation of subsequent fields. Although the MPEG-4 standard allows any combination of 2-bit window sequence and 1-bit shape, it was observed that some high-performance MPEG-4 AAC encoders such as Nero (www.nero.com) only use specific combinations of these two fields. These combinations are listed in Table VIII, which illustrates that the resulting 3-bit codebook represents a code with minimum distance 2. Hence, in the context of noisy decoding, it is advantageous to consider these two fields jointly as a 3-bit window sequence and shape (wss) field, shown as blocks 602 and 609 in FIG. 6. Due to the fact that 3-bit wss sequences are at distance 2 from each other, joint decoding of this field is much more reliable than separate decoding of the 2-bit window sequence and 1-bit window shape. To give an example, for transmission of over a AWGN channel at the SNR of 5 dB, the hard decoder bit error rate is about $6 \times 10^{-3}$, while joint soft decoding of the 3-bit wss field gives a bit error rate of about $2 \times 10^{-4}$, i.e., 30 times lower.

TABLE VIII

The joint 3-bit window sequence and shape (wss) field.

| Bits | Interpretation |
|---|---|
| 001 | ONLY_LONG_SEQUENCE with Kaiser-Bessel derived (KBD) window shape |
| 010 | LONG_START_SEQUENCE with sine window shape |
| 100 | EIGHT_SHORT_SEQUENCE with sine window shape |
| 111 | LONG_STOP_SEQUENCE with Kaiser-Bessel derived (KBD) window shape |

The field following the wss field is the max_sfb field. This field is 6 bits long in LONG windows (block 603), and 4 bits long in SHORT windows (block 610). However, in the LONG windows, 6-bit values higher than 51 (i.e., 52, 53, ... 63) are not allowed. Further, the set of values observed in practice is actually much smaller. Table IX lists the set of values of max_sfb observed on a large audio dataset (over 2 hours of audio) spanning several program types such as jazz, classical music, newscast, talk shows, etc., encoded using the Nero codec at several different bitrates. As seen in the table, the set of values occurring in practice is much smaller than the set of possible values, which may be taken advantage of in decoding, either for error detection or correction.

TABLE IX

Observed values of max_sfb at various bitrates.

| wss | Bitrate (kbps) | Observed values of max_sfb |
|---|---|---|
| 001 | 20 | 36, 43, 44, 45, 46 |
| 001 | 22 | 36, 43, 44, 45, 46 |
| 001 | 24 | 37, 43, 44, 45, 46 |
| 001 | 48 | 43, 45, 46 |
| 001 | 96 | 45, 46 |
| 010 | 20 | 0, 36, 43, 44, 45, 46 |
| 010 | 22 | 0, 36, 43, 44, 45, 46 |
| 010 | 24 | 0, 37, 43, 44, 45, 46 |
| 010 | 48 | 0, 43, 45, 46 |
| 010 | 96 | 0, 45, 46 |
| 100 | 20 | 10, 11 |
| 100 | 22 | 10, 11 |
| 100 | 24 | 11 |
| 100 | 48 | 13, 14 |
| 100 | 96 | 15 |
| 111 | 20 | 36, 43, 44, 45, 46 |
| 111 | 22 | 36, 43, 44, 45, 46 |
| 111 | 24 | 37, 43, 44, 45, 46 |
| 111 | 48 | 43, 45, 46 |
| 111 | 96 | 45, 46 |

Figure 7:
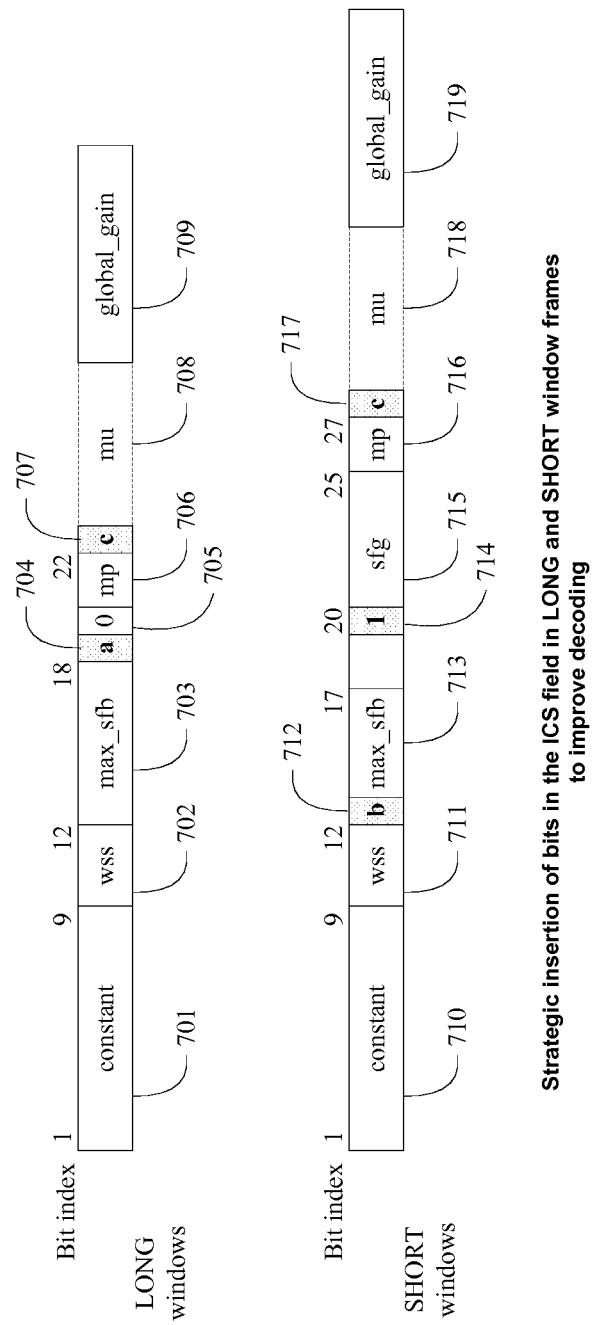
FIG. 7 illustrates bit insertion into the ICS field for the purpose of improving decoding performance in accordance with certain embodiments of the present invention.

In addition to these existing properties of wss and max_sfb fields, which help in decoding, one can strategically insert bits into the ICS field at the encoder to further increase the distance among permissible source sequences. Some possibilities are illustrated in FIG. 7, where blocks 701, 702, 710, and 711 are the same as blocks 601, 602, 608, 609 in FIG. 6. One possibility is to append one bit to the max_sfb field. In LONG window frames, the extra bit is appended at the end of the max_sfb field: the max_msb field is shown as block 703, while the extra bit is labeled a and shown as block 704. In SHORT windows, the extra bit is appended just before the beginning of the max_sfb field: the max_msb field is shown as 713, while the extra bit is labeled b and shown as block 712. These bits can be chosen as shown in Table X. The table shows the observed values of max_sfb in LONG and SHORT windows, as well as their binary expansions. With the appended bits, max_sfb codebooks in both LONG and SHORT windows have minimum distance 2. Moreover, the first five bits in the LONG codebook have minimum distance 1 relative to the max_sfb codewords (extended by bit b) in SHORT windows, which, combined with the wss field, makes it easier to distinguish LONG and SHORT windows.

TABLE X

Appending bits to max_sfb to improve performance.
Bit a is appended at the end of the max_sfb field
in LONG windows, while bit b is appended at the
beginning of the max_sfb field in SHORT windows.

| window | max_sfb value | max_sfb binary | | | | | | a |
|---|---|---|---|---|---|---|---|---|
| LONG | 0 | 0 | 0 | 0 | 0 | 0 | 0 | 1 |
| | 36 | 1 | 0 | 0 | 1 | 0 | 0 | 0 |
| | 37 | 1 | 0 | 0 | 1 | 0 | 1 | 1 |
| | 43 | 1 | 0 | 1 | 0 | 1 | 1 | 1 |

TABLE X-continued

Appending bits to max_sfb to improve performance. Bit a is appended at the end of the max_sfb field in LONG windows, while bit b is appended at the beginning of the max_sfb field in SHORT windows.

| window | max_sfb value | b | max_sfb binary | | | | |
|---|---|---|---|---|---|---|---|
| | 44 | 1 | 0 | 1 | 1 | 0 | 0 1 |
| | 45 | 1 | 0 | 1 | 1 | 0 | 1 0 |
| | 46 | 1 | 0 | 1 | 1 | 1 | 0 0 |
| SHORT | 10 | 0 | 1 | 0 | 1 | 0 | |
| | 11 | 1 | 1 | 0 | 1 | 1 | |
| | 13 | 1 | 1 | 1 | 0 | 1 | |
| | 14 | 1 | 1 | 1 | 1 | 0 | |
| | 15 | 0 | 1 | 1 | 1 | 1 | |

Following the max_sfb field in LONG windows is the 1-bit predictor_data_present flag (block 604 in FIG. 6, 705 in FIG. 7), which is set to 0 in high-efficiency MPEG-4 AAC. In SHORT windows following the max_sfb field is the 7-bit scale factor grouping (sfg) field (block 611). In FIG. 7, bit 1 is inserted after the second bit of the sfg field in SHORT windows, at bit index 20 (which would be bit index 19 without insertion of bit b described above). This new bit is shown as block 714 in the figure. The corresponding position in the LONG windows holds the predictor_data_present flag mentioned above, shown as block 705 in FIG. 7. Hence, when this bit is considered jointly with the 3-bit wss field, one gets a 4-bit field whose codewords have distance 3 from each other, providing additional gain in distinguishing SHORT from LONG window frames. Coupled with bits a and b appended to max_sfb field as described above, one gets minimum distance 4 between LONG and SHORT windows up to bit index 20.

Following the predictor_data_present flag in LONG windows and the sfg field in SHORT windows is the 2-bit MS mask present (mp) field, shown as blocks 605 and 612 in FIG. 6. In FIG. 7, one bit is inserted after the 2-bit mp field in both LONG and SHORT window frames. The mp field is represented by blocks 706 and 716 in FIG. 7. According to the MPEG-4 standard, valid values of the mp field are 00, 01, and 10. The new bit is denoted by c and indicated as blocks 707 and 717 in FIG. 7. If this bit is chosen according to Table XI, then the resulting 3-bit codebook composed of the mp field and the added bit c has a minimum distance 2, which will further improve decoding performance. Decoding the mp field correctly is important for proper interpretation of subsequent bits. Similar bit additions may be applied to the 7-bit scalefactor grouping (sfg) field in SHORT windows as well. Depending on the value of the 2-bit mp field, the next field is the variable-length MS mask used (mu) field in both types of windows (shown as blocks 606 and 613 in FIGS. 6, 708 and 718 in FIG. 7), and finally the 8-bit global gain field (shown as blocks 607 and 614 in FIGS. 6, 709 and 719 in FIG. 7). Bit additions similar to the ones described above may be devised for the global gain field, as well as the section data following the global gain field (FIG. 3).

TABLE XI

Adding bit c to the mp field to make a distance-2 code.

| mp | c |
|---|---|
| 00 | 1 |
| 01 | 0 |
| 10 | 0 |

Section data is composed of an alternating sequence of 4-bit Huffman codebook indices and variable-bit length section length, which itself is composed of one or more section length increments that are 3 bits long in SHORT windows, and 5 bits long in LONG windows. It is possible to add parity bits to individual Huffman codebook indices or section length increments, or groups of these fields. It should be mentioned that section data provides a syntax check that can be used to detect certain error patterns. In particular, according to the MPEG-4 standard, the sum of all section length increments should equal the total number of scalefactor bands. Hence, bit errors in section length increments are likely to cause syntax violation.

It should be mentioned that correct decoding of section data is important for spectral data decoding, while for decoding of scalefactors, which are thought to be more important for perceptual audio quality, it is only important to decode the length of the section data correctly, because scalefactors follow immediately after the section data. The point is illustrated by the following example, where one (8,4) Hamming sync sequence (Table VI) is appended at the end of the ICS field, and another Hamming sync sequence is appended at the end of the scalefactor field. The 4-bit index of the sync sequence appended to the scalefactor field is simply chosen based on the weight of the scalefactor field as $$\text{scalefactor\_SYNC\_index} = \text{scalefactor\_weight} \% 16 \qquad (1)$$

where % symbol corresponds to the modulo operation. Meanwhile, the 4-bit index of the sync sequence appended to the ICS field, ICS_SYNC_index=$(b_1, b_2, b_3, b_4)$, is chosen based on several attributes of the ICS field. In SHORT windows, the index bits are chosen as $b_1 = \text{sfg\_bit\_4} \oplus \text{sfg\_bit\_5}$ $b_2 = \text{sfg\_bit\_6} \oplus \text{sfg\_bit\_7}$ $$(b_3, b_4) = \text{ICS\_weight} \% 4, \qquad (2)$$

where sfg_bit_i is the i-th bit of the sfg field (611 in FIG. 6), and $\oplus$ represents modulo-2 addition. On the other hand, the index bits in LONG windows are chosen as $b_1 = \text{mp\_bit\_2}$ $$(b_2, b_3, b_4) = \text{ICS\_weight} \% 8, \qquad (3)$$

where mp_bit_i is the i-th bit of the mp field (605 in FIG. 6). This attribute-based selection of sync sequences is based on the observation that in SHORT windows, correct decoding of the sfg field is quite important, because sfg determines the total number of scalefactor bands in the frame (which in turn creates the constraint for syntax check of the section data field). LONG frames do not contain the sfg field, so one bit out of another important field, the mp field, is included in the 4-bit index. The mp field determines whether the MS mask used (mu) field (606 in FIG. 6) is present in the frame, which influences the length of the decoded ICS field.

Figure 19:
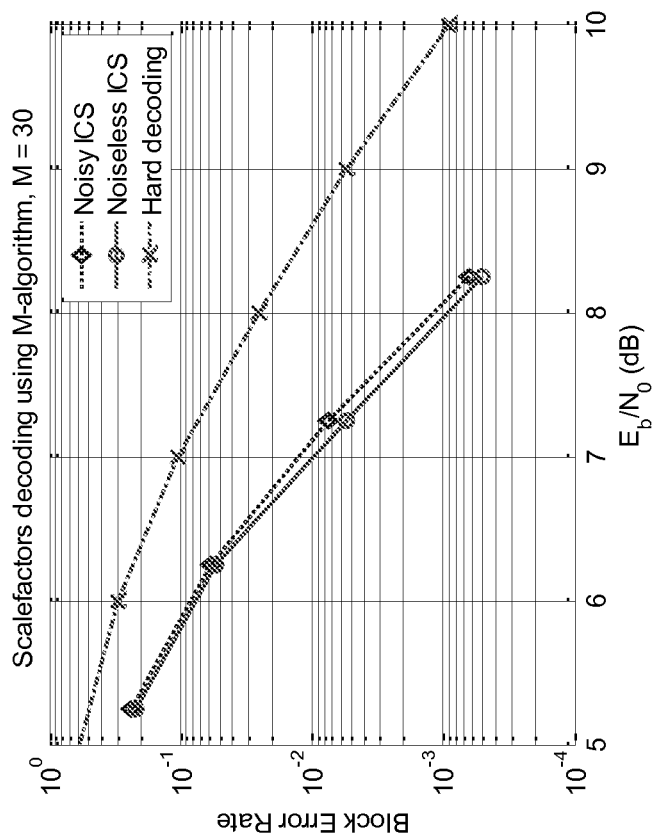
FIG. 19 shows the performance of scalefactors decoding with one SYNC sequence appended to the ICS field and one SYNC sequence appended to the scalefactors field in accordance with certain embodiments of the present invention.

With such attribute-based sync selection, the block error rates in scalefactor decoding for the hard decoder and two soft decoders are measured. One soft decoder uses the noisy ICS field. It first finds the 7 lowest-magnitude input soft bits, generates $2^7$ hypotheses by replacing these 7 soft bits by all combinations of the corresponding hard bits, and then finds the MAP estimate of ICS data. ICS data then provide the number of scalefactors, while the length of the ICS field indicates the start position of the scalefactor field. Scalefactors are then decoded using the M-algorithm with M=30. The second soft decoder uses the noiseless ICS data and runs the M-algorithm on the scalefactors with M=30, just like the first soft decoder, but with the exact knowledge of the start position of the scalefactor field and the number of scalefactors. The results are shown in FIG. 19. It is evident that, as far as scalefactor decoding goes, the first soft decoder is almost as good as the second one, which uses noiseless ICS data. In other words, all data necessary for scalefactor decoding is almost perfectly decoded by the first soft decoder. Both soft decoders provide about 2 dB gain relative to the hard decoder at the block error rate of $10^{-3}$. It should be noted that there could still be residual errors in the decoded ICS data of the first soft decoder, but these errors are generally confined to the fields that do not influence scalefactor decoding, such as Huffman codebook indices in section data.

Scalefactor Decoding: In MPEG-4 AAC, scalefactors are encoded using a Huffman codebook consisting of 121 codewords. As already mentioned, for successful decoding, it is necessary to know the starting position of the scalefactor field and the number of scalefactors. In some specific encoder configurations known in the art, such as the low-complexity mono MPEG-4 AAC configuration, a known 3-bit sequence 000 terminates the scalefactor bit stream, which can be utilized to improve decoding performance. In other configurations, and also in the cases where different performance complexity trade-offs are desired, various features described herein such as alternating SYNC sequences, "smart" SYNCs, and combinations thereof, may be employed. Scalefactor decoding was used as a running example in the description of some of the embodiments to illustrate various aspects and performance gains.

Following the scalefactor field is the pulse data field (305 in FIG. 3), which consists of a 1-bit pulse data indicator and, if the indicator equals 1, the pulse data itself. Pulse data is one way that the MPEG-4 AAC standard provides for coding large quantized values that exceed maximum symbol values in Huffman codebooks. Another way for coding these values is through the use of the ESCAPE Huffman codebook. Source encoders are free to choose either of these methods for coding large quantized values. It was observed that some high-performance MPEG-4 AAC encoders such as Nero (www.nero.com) only use the ESCAPE Huffman codebook for this purpose, so the pulse data field in the described simulations was only 1-bit long (pulse data indicator) and equal to 0.

TNS Decoding: The next field in the MPEG-4 AAC packet is the Temporal Noise Shaping (TNS) field, indicated by block 306 in FIG. 3. It consists of a 1-bit TNS data indicator followed by the TNS data, if the indicator equals 1. TNS data specifies the parameters of noise shaping filters used to enhance the quality of the encoded audio signal. It contains the following parameters the number of filters (1 bit in SHORT windows, 2 bits in LONG windows);

filter coefficient resolution (1 bit in both types of windows);

the number of scalefactor bands to which TNS is applied (4 bits in SHORT windows with maximum allowed value of 14, 6 bits in LONG windows with maximum allowed value of 46);

filter order (3 bits in SHORT windows, 5 bits in LONG windows with maximum allowed value of 12);

filtering direction (upward or downward in frequency, 1 bit);

indicator of compression of filter coefficients (1 bit);

filter coefficients, whose number is determined by filter order, and whose bit length is determined by the coefficient resolution and the compression indicator.

Each of these parameters is encoded into the bit stream by the binary representation of its value, rather than by VLC coding. Hence, the decoding of the TNS field is more similar in spirit to the decoding of the ICS field, rather than the scalefactor field. Concepts described in the previous embodiments, such as SYNC sequence insertion, parity bit insertion, or bit insertion for the purpose of increasing the distance among various allowed values of a particular parameter, as well as combinations thereof, are all applicable to the TNS field as well. Generally, the parameters that appear earlier in the TNS field, such as the number of filters, coefficient resolution, and filter order, are more important for successful decoding than the parameters that appear later in the field, such as filter coefficients. This is because earlier parameters influence parsing and interpretation of latter parameters. For example, an error in the first parameter (the number of filters) will lead to a wrong decoded length of the TNS field whereas an error in a filter coefficient will not. Hence, the goal of SYNC sequence or bit insertion would be to achieve a desired performance complexity trade-off by exploiting the mentioned structure and properties of the TNS data field.

Following the TNS data field is the gain control data field (307 in FIG. 3), which consists of a 1-bit gain control indicator and, if the indicator equals 1, the gain control data itself. The simulations described herein were performed on high-efficiency MPEG-4 AAC data, where gain control is not used, so this field was only 1-bit long (gain control indicator) and equal to 0.

Spectral Data Decoding: The next field in the MPEG-4 AAC packet is the spectral data field (308 in FIG. 3). Spectral coefficients are encoded in pairs or quadruples using a set of 11 Huffman codebooks. Different Huffman codebooks can be used in different frequency bands. The widths of frequency bands and Huffman codebook indices used in individual bands are specified by section data at the end of the ICS field. Some of the Huffman codebooks, referred to as "signed" codebooks, are used for coding signed values of quantized spectral coefficients directly. Decoding spectral data coded by signed Huffman codebooks is essentially the same as scalefactor decoding, and the same concepts described in the context of scalefactor decoding are directly applicable here as well.

Other codebooks, referred to as "unsigned" codebooks, code only the magnitudes of quantized spectral coefficients, while their signs are inserted into the bit stream separately, immediately following the codeword for the magnitude. One can think of a codeword followed by sign bits as an "extended" codeword that includes the sign information $$\text{extended\_codeword}=[\text{unsigned\_codeword}, \text{sign\_bits}] \quad (4)$$

Hence, although seemingly different, the decoding of spectral data encoded by unsigned Huffman codebooks is also essentially the same as scalefactor decoding, if one considers extended codewords illustrated above. The same concepts, such as alternating and "smart" SYNCs, described in the context of scalefactor decoding, are directly applicable to this case as well.

Figure 20:
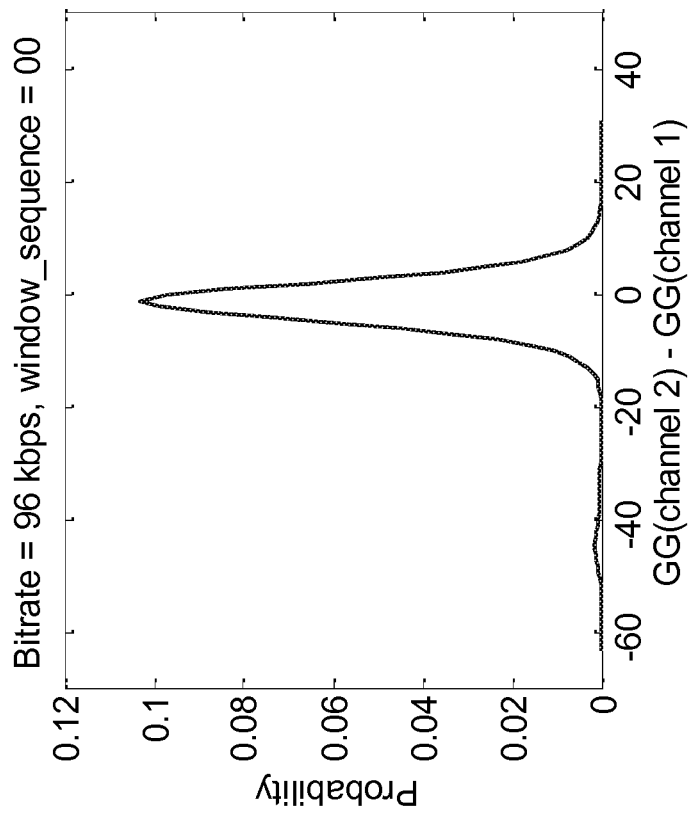
FIG. 20 shows the observed probability distribution of the difference between the global gains of the two stereo channels in the same MPEG-4 AAC audio frame in accordance with certain embodiments of the present invention.

In MPEG-4 AAC coding of stereo audio, after the spectral data for the first channel, the data of the second audio channel are encoded, starting with the global gain and section data (309 in FIG. 3). It is observed that the value of the global gain of the second channel is usually very close to the global gain value of the first channel. FIG. 20 shows the observed probability distribution of the difference between the two global gain values, measured on a large audio dataset mentioned in other embodiments. It can be seen that the most frequent values of the difference are concentrated around 0, indicating that the two global gain values are very similar most of the time. This may be used to improve the detection of the end of the bit stream of the first channel, and the beginning of the bit stream of the second channel. Additional synchronization tools such as alternating or "smart" SYNCs may be used to further enhance the detection of the boundary between the first and second audio channel. Beyond this, the decoding of the individual fields of the second audio channel (309-314 in FIG. 3) is the same as the decoding of the corresponding fields of the first audio channel, as described in other embodiments.

The various features described in the foregoing are applicable to other source encoders, including other audio encoders, as well as image, video, and text encoders. As with the examples above, the goal of "smart" SYNCs and bit insertion would be to increase the distance among the permissible source sequences, utilizing the source structure to gain efficiency, which results in improved decoding performance.

While there have been shown and described various novel features of the invention as applied to particular embodiments thereof, it will be understood that various omissions and substitutions and changes in the form and details of the systems and methods described and illustrated may be made by those skilled in the art without departing from the spirit of the invention. Those skilled in the art will recognize, based on the above disclosure and an understanding of the teachings of the invention, that the particular methods, hardware and devices that are part of this invention, and the general functionality provided by and incorporated therein, may vary in different embodiments of the invention. Accordingly, the particular system components shown in FIG. 1-FIG. 20, and Table I-Table XI are for illustrative purposes to facilitate a full and complete understanding, as well as an appreciation of the various aspects and functionality of particular embodiments, of the invention. Those skilled in the art will appreciate that the invention can be practiced in other than the described embodiments, which are presented for purposes of illustration and not limitation, and the present invention is limited only by the claims which follow.

What is claimed is:

1. A system for augmenting a source message bit sequence with a synchronization sequence to facilitate better source decoding, the system comprising:
   a source message bit sequence;
   a source encoder, wherein said source encoder inserts at least one synchronization sequence into the source message bit sequence to create an encoded source message bit sequence and jointly decodes the encoded source message bit sequence, wherein the decoding of the encoded source message bit sequence is based on the at least one synchronization sequence, the at least one synchronization sequence being selected from a set of at least two defined synchronization sequences, the selection based on one or more characteristics of the source message bit sequence, said characteristics comprising weight modulo-q of the source message bit sequence, said weight modulo-q of the source message bit sequence corresponding to the remainder of the weight of the source message bit sequence divided by q, said weight corresponding to the number of bits in the source message bit sequence equal to 1; and
   a transmitter, wherein said transmitter transmits the source message bit sequence containing said at least one synchronization sequence.

2. The system of claim 1 wherein the defined synchronization sequences are selected to minimize the bit-error-rate or packet-error-rate performance of source decoding.

3. The system of claim 1 wherein the defined synchronization sequences are selected to maximize Hamming distances between synchronization sequences in the set.

4. The system of claim 3 wherein the defined synchronization sequences are also selected to have low autocorrelation function sidelobes.

5. A method for augmenting a source message bit sequence with two or more synchronization sequences placed at different bit positions within the source message in order to facilitate better source decoding, the method comprising:
   a. placing each one of said two or more synchronization sequences at a different bit position within the source message bit sequence wherein said two or more synchronization sequences are for jointly decoding the encoded source message bit sequence, and said two or more synchronization sequences are selected from a plurality of sets of defined synchronization sequences, each set corresponding to said different bit positions within the source message bit sequence, wherein the size of each said set is at least M≥1 and at least one said set is of size M≥2;
   b. for each source message bit sequence, selecting a specific synchronization sequence from said plurality of sets, wherein each set has M available synchronization sequences for a specific position, wherein the selection of said specific synchronization sequence is based on one or more characteristics of a source sequence comprising weight modulo-q said weight modulo-q of the source message bit sequence corresponding to the remainder of the weight of the source message bit sequence divided by q, said weight corresponding to the number of bits in the source message bit sequence equal to 1; and
   c. inserting each said selected specific synchronization sequence at said specific position.

6. The method of claim 5 wherein the synchronization sequences are selected to minimize the bit-error-rate or packet-error-rate performance of source decoding.

7. The method of claim 5 wherein said two or more synchronization sequences are selected to maximize the Hamming distance among each other, and minimize the autocorrelation sidelobes for a given sequence length.

8. The method of claim 5 wherein the selection of said specific synchronization sequence is further based on linear and nonlinear combinations of the frequencies and values of the symbols in the source message bit sequence.

9. A method for augmenting segments of a source message bit sequence with additional bits in order to facilitate better source decoding, wherein the segments may include one or more symbols, groups of symbols, fields and groups of fields, the method comprising:
   a. selecting a segment of a source message bit sequence to augment; and
   b. inserting one or more synchronization sequence bits in, or appending said one or more synchronization sequence bits to, based on one or more characteristics of the source message bit sequence, said characteristics comprising weight modulo-q of the source message bit sequence, said weight modulo-q of the source message bit sequence corresponding to the remainder of the weight of the source message bit sequence divided by q, said weight corresponding to the number of bits in the source message bit sequence equal to 1; one of the selected segments to maximize the distance of the segment values or to minimize the probability of erroneous decoding of the segment,
      wherein said one or more synchronization sequence bits are for jointly decoding the selected segment, and
      wherein the selected segment for augmentation occurs more frequently than other segments and is important for decoding or interpreting other segments in the source message bit sequence.

10. A method for encoding of a source packet for unequal error protection of selected parts of the source packet which consists of multiple fields of source bits, the method comprising:
   a. partitioning the source packet into two or more subpackets, wherein each subpacket comprises one or more source encoded fields, and wherein each subpacket has a different level of error protection;
   b. for one or more of said subpackets containing one or more source encoded fields, encoding selectively at a transmitter said one or more subpackets with a code for resolving errors to provide additional error protection for more reliable decoding of said one or more subpackets in order to achieve a desired level of performance after decoding, wherein said code for resolving errors is at least one synchronization sequence for jointly decoding the subpacket from a set of at least two defined synchronization sequences, and said encoding comprises:
      selecting an alternating synchronization sequence from the set of at least two defined synchronization sequences based on one or more characteristics of the subpacket, said characteristics comprising weight modulo-q of the subpacket, said weight modulo-q of the subpacket corresponding to the remainder of the weight of the subpacket divided by q, said weight corresponding to the number of bits in the subpacket equal to 1;
      inserting said selected synchronization sequence into the subpacket,
   c. encoding each subpacket with a CRC code to produce a CRC bit sequence to facilitate separate error concealment of said two or more subpackets in a decoder, wherein the length of different CRC bit sequences may be different depending at least in part on one or more of the subpacket length and the desired level of required error protection, wherein said code for resolving errors and said CRC code facilitate resolving errors during joint decoding of each subpacket at a receiver.

11. The method of claim 10 wherein said code for resolving errors in said joint decoding to provide additional error protection includes a forward error correction code.

12. The method of claim 10 wherein said code for resolving errors in said joint decoding to provide additional error protection includes a single parity check code.

13. The method of claim 10 wherein said characteristics of the subpacket further comprise a frequency of at least one symbol in the source message bit sequence, and value of at least one symbol in the source message bit sequence.

14. The method of claim 10 wherein the performance of the source decoding is measured in terms of perceptual quality.

15. The system of claim 1 wherein said characteristics of the source message bit sequence further comprise a frequency of at least one symbol in the source message bit sequence, and value of at least one symbol in the source message bit sequence.

16. The system of claim 10 wherein said characteristics of the subpacket further comprise a frequency of at least one symbol in the subpacket, and value of at least one symbol in the subpacket.

* * * * *